United States Patent
Lee et al.

(10) Patent No.: US 11,916,228 B2
(45) Date of Patent: *Feb. 27, 2024

(54) BINDING AGENTS FOR ELECTROCHEMICALLY ACTIVE MATERIALS AND METHODS OF FORMING THE SAME

(71) Applicant: Enevate Corporation, Irvine, CA (US)

(72) Inventors: David Lee, Irvine, CA (US); Xiaohua Liu, Irvine, CA (US); Monika Chhorng, Irvine, CA (US); Jeff Swoyer, Irvine, CA (US); Benjamin Yong Park, Irvine, CA (US); Rahul Kamath, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,389

(22) Filed: Jun. 6, 2022

(65) Prior Publication Data

US 2022/0376233 A1 Nov. 24, 2022

Related U.S. Application Data

(63) Continuation of application No. 17/484,706, filed on Sep. 24, 2021, now Pat. No. 11,355,748, which is a
(Continued)

(51) Int. Cl.
*H01M 4/36* (2006.01)
*C03C 3/04* (2006.01)
(Continued)

(52) U.S. Cl.
CPC ............ *H01M 4/366* (2013.01); *C03C 3/045* (2013.01); *C04B 35/522* (2013.01);
(Continued)

(58) Field of Classification Search
CPC ...... H01M 4/133; H01M 4/134; H01M 4/362; H01M 4/364; H01M 4/366; H01M 4/386; H01M 4/587; H01M 4/661
See application file for complete search history.

(56) References Cited

U.S. PATENT DOCUMENTS

| | | |
|---|---|---|
| 3,990,098 A | 11/1976 | Mastrangelo |
| 5,468,358 A | 11/1995 | Ohkawa et al. |

(Continued)

FOREIGN PATENT DOCUMENTS

| | | |
|---|---|---|
| CN | 1667855 | 9/2005 |
| CN | 102834955 | 12/2012 |

(Continued)

OTHER PUBLICATIONS

Choi et al., Enhanced Electrochemical High Performance of a Si-based Anode Using an Electrochemically Active Polyamide Imide Binder, Journal of Power Sources, 2008, vol. 177, pp. 590-594.

(Continued)

*Primary Examiner* — Brittany L Raymond
(74) *Attorney, Agent, or Firm* — McAndrews, Held & Malloy, Ltd.

(57) ABSTRACT

In some embodiments, an electrode can include a current collector, a composite material in electrical communication with the current collector, and at least one phase configured to adhere the composite material to the current collector. The current collector can include one or more layers of metal, and the composite material can include electrochemically active material. The at least one phase can include a compound of the metal and the electrochemically active material. In some embodiments, a composite material can include electrochemically active material. The composite material can also include at least one phase configured to bind electrochemically active particles of the electrochemically (Continued)

active material together. The at least one phase can include a compound of metal and the electrochemically active material.

19 Claims, 13 Drawing Sheets

Related U.S. Application Data continuation of application No. 15/995,002, filed on May 31, 2018, now Pat. No. 11,133,498.

(60) Provisional application No. 62/596,077, filed on Dec. 7, 2017.

(51) Int. Cl.

| | | |
|---|---|---|
| *C04B 35/52* | (2006.01) | |
| *C04B 35/524* | (2006.01) | |
| *H01G 11/30* | (2013.01) | |
| *H01G 11/32* | (2013.01) | |
| *H01G 11/58* | (2013.01) | |
| *H01G 11/64* | (2013.01) | |
| *H01M 4/13* | (2010.01) | |
| *H01M 4/133* | (2010.01) | |
| *H01M 4/134* | (2010.01) | |
| *H01M 4/1393* | (2010.01) | |
| *H01M 4/1395* | (2010.01) | |
| *H01M 4/38* | (2006.01) | |
| *H01M 4/485* | (2010.01) | |
| *H01M 4/58* | (2010.01) | |
| *H01M 4/587* | (2010.01) | |
| *H01M 4/62* | (2006.01) | |
| *H01M 4/66* | (2006.01) | |
| *H01M 10/0525* | (2010.01) | |
| *H01M 10/0562* | (2010.01) | |
| *H01M 10/0567* | (2010.01) | |
| *H01M 4/02* | (2006.01) | |
| *H01M 4/04* | (2006.01) | |

(52) U.S. Cl.
CPC ........... *C04B 35/524* (2013.01); *H01G 11/30* (2013.01); *H01G 11/32* (2013.01); *H01G 11/58* (2013.01); *H01G 11/64* (2013.01); *H01M 4/13* (2013.01); *H01M 4/133* (2013.01); *H01M 4/134* (2013.01); *H01M 4/1393* (2013.01); *H01M 4/1395* (2013.01); *H01M 4/362* (2013.01); *H01M 4/364* (2013.01); *H01M 4/386* (2013.01); *H01M 4/485* (2013.01); *H01M 4/5825* (2013.01); *H01M 4/587* (2013.01); *H01M 4/622* (2013.01); *H01M 4/625* (2013.01); *H01M 4/661* (2013.01); *H01M 10/0525* (2013.01); *H01M 10/0562* (2013.01); *H01M 10/0567* (2013.01); *H01M 2004/021* (2013.01); *H01M 2004/027* (2013.01); *H01M 4/0404* (2013.01); *H01M 4/0435* (2013.01); *H01M 2300/0034* (2013.01)

(56) References Cited

U.S. PATENT DOCUMENTS

| | | | |
|---|---|---|---|
| 5,624,606 A | 4/1997 | Wilson et al. | |
| 5,682,288 A | 10/1997 | Wani | |
| 5,981,107 A | 11/1999 | Hamano et al. | |
| 6,103,423 A | 8/2000 | Itoh et al. | |
| 6,287,728 B1 | 9/2001 | Kajiura et al. | |
| 6,300,013 B1 | 10/2001 | Yamada et al. | |
| 6,413,672 B1 | 7/2002 | Suzuki et al. | |
| 6,432,579 B1 | 8/2002 | Tsuji et al. | |
| 6,436,576 B1 | 8/2002 | Hossain | |
| 6,489,061 B1 | 12/2002 | Hossain | |
| 6,589,696 B2 | 7/2003 | Matsubara et al. | |
| 6,770,399 B2 | 8/2004 | Umeno et al. | |
| 6,946,223 B2 | 9/2005 | Kusumoto et al. | |
| 6,949,314 B1 | 9/2005 | Hossain | |
| 7,037,581 B2 | 5/2006 | Aramata et al. | |
| 7,202,000 B2 | 4/2007 | Iriyama et al. | |
| 7,303,838 B2 | 12/2007 | Morita et al. | |
| 7,316,792 B2 | 1/2008 | Kosuzu et al. | |
| 7,615,314 B2 | 11/2009 | Kawakami et al. | |
| 7,670,970 B2 | 3/2010 | Ko | |
| 8,603,683 B2 | 12/2013 | Park et al. | |
| 8,709,653 B2 | 4/2014 | Lee et al. | |
| 9,178,208 B2 | 11/2015 | Park et al. | |
| 9,397,338 B2 | 7/2016 | Park et al. | |
| 9,553,303 B2 | 1/2017 | Park et al. | |
| 9,583,757 B2 | 2/2017 | Park et al. | |
| 9,620,809 B2 | 4/2017 | Turon Teixidor et al. | |
| 9,647,259 B2 | 5/2017 | Park et al. | |
| 9,806,328 B2 | 10/2017 | Park et al. | |
| 9,941,509 B2 | 4/2018 | Park et al. | |
| 9,997,765 B2 | 6/2018 | Park | |
| 10,103,378 B2 | 10/2018 | Park et al. | |
| 10,388,943 B2 | 8/2019 | Bonhomme et al. | |
| 10,461,366 B1 | 10/2019 | Anderson et al. | |
| 10,491,808 B1 | 10/2019 | Park et al. | |
| 10,516,155 B2 | 12/2019 | Park et al. | |
| 10,541,412 B2 | 1/2020 | Wang et al. | |
| 2004/0137327 A1 | 7/2004 | Gross et al. | |
| 2005/0266304 A1 | 12/2005 | Honda et al. | |
| 2006/0035149 A1 | 2/2006 | Nanba | |
| 2006/0040182 A1 | 2/2006 | Kawakami et al. | |
| 2006/0051670 A1 | 3/2006 | Aramata et al. | |
| 2006/0051675 A1 | 3/2006 | Musha et al. | |
| 2006/0127773 A1 | 6/2006 | Kawakami et al. | |
| 2006/0134516 A1 | 6/2006 | Im et al. | |
| 2006/0147802 A1 | 7/2006 | Yasuda et al. | |
| 2006/0148191 A1 | 7/2006 | Mitchell et al. | |
| 2006/0275668 A1 | 12/2006 | Peres et al. | |
| 2007/0054190 A1 | 3/2007 | Fukui et al. | |
| 2007/0054193 A1 | 3/2007 | Ota | |
| 2007/0072084 A1 | 3/2007 | Katsushi et al. | |
| 2007/0077490 A1 | 4/2007 | Kim et al. | |
| 2007/0154811 A1 | 7/2007 | Oh et al. | |
| 2007/0212610 A1 | 9/2007 | Sonobe et al. | |
| 2007/0243469 A1 | 10/2007 | Kim et al. | |
| 2008/0020282 A1 | 1/2008 | Kim et al. | |
| 2008/0145757 A1 | 6/2008 | Mah et al. | |
| 2008/0145761 A1 | 6/2008 | Petrat et al. | |
| 2008/0160409 A1 | 7/2008 | Ishida et al. | |
| 2008/0280207 A1 | 11/2008 | Patoux et al. | |
| 2008/0286657 A1 | 11/2008 | Hasegawa et al. | |
| 2009/0004566 A1 | 1/2009 | Shirane et al. | |
| 2009/0023065 A1 | 1/2009 | Dwang | |
| 2009/0029256 A1 | 1/2009 | Mah et al. | |
| 2009/0053608 A1 | 2/2009 | Choi et al. | |
| 2009/0061319 A1* | 3/2009 | Kim .................. | H01M 4/386 429/223 |
| 2009/0087743 A1 | 4/2009 | Kim et al. | |
| 2009/0117467 A1 | 5/2009 | Zhamu et al. | |
| 2009/0117468 A1 | 5/2009 | Eom | |
| 2009/0181304 A1 | 7/2009 | Miyamoto et al. | |
| 2009/0202911 A1 | 8/2009 | Fukuoka et al. | |
| 2009/0246632 A1 | 10/2009 | Fukui et al. | |
| 2009/0269667 A1 | 10/2009 | Antonietti et al. | |
| 2009/0280414 A1 | 11/2009 | Koh et al. | |
| 2009/0283875 A1 | 11/2009 | Garandet et al. | |
| 2009/0325072 A1 | 12/2009 | Maeda et al. | |
| 2010/0015530 A1 | 1/2010 | Katayama et al. | |
| 2010/0068628 A1 | 3/2010 | Ueda | |
| 2010/0078599 A1 | 4/2010 | Kumta et al. | |
| 2010/0119955 A1 | 5/2010 | Abe et al. | |
| 2010/0143798 A1 | 6/2010 | Zhamu et al. | |
| 2010/0233534 A1* | 9/2010 | Iwama ................. | H01M 4/661 429/209 |
| 2010/0255376 A1 | 10/2010 | Park et al. | |

(56) References Cited

U.S. PATENT DOCUMENTS

| | | |
|---|---|---|
| 2010/0285352 A1 | 11/2010 | Juzkow et al. |
| 2010/0297497 A1 | 11/2010 | Takahata |
| 2011/0020701 A1 | 1/2011 | Park et al. |
| 2011/0206974 A1 | 1/2011 | Inoue et al. |
| 2011/0236761 A1 | 9/2011 | Endo et al. |
| 2012/0156562 A1 | 6/2012 | Kobayashi et al. |
| 2013/0202960 A1 | 8/2013 | Kim |
| 2014/0057170 A1 | 2/2014 | Cha et al. |
| 2014/0170451 A1 | 6/2014 | Iwasaki et al. |
| 2014/0170498 A1 | 6/2014 | Park |
| 2015/0010830 A1 | 1/2015 | Park et al. |
| 2015/0137822 A1 | 5/2015 | Joe et al. |
| 2016/0064731 A1* | 3/2016 | Jung ........................ H01M 4/62 252/182.1 |
| 2016/0359164 A1 | 12/2016 | Mui et al. |
| 2017/0040598 A1 | 2/2017 | Wang et al. |
| 2017/0092950 A1* | 3/2017 | Xiao ..................... H01M 4/362 |
| 2017/0133664 A1 | 5/2017 | Park |
| 2017/0133665 A1 | 5/2017 | Park |
| 2017/0155126 A1 | 6/2017 | Park |
| 2017/0170510 A1 | 6/2017 | Teixidor et al. |
| 2017/0279093 A1 | 9/2017 | Park |
| 2018/0062154 A1 | 3/2018 | Park et al. |
| 2018/0198114 A1 | 7/2018 | Bonhomme et al. |
| 2018/0219211 A1 | 8/2018 | Park et al. |
| 2018/0226642 A1 | 8/2018 | Wang et al. |
| 2018/0287129 A1 | 10/2018 | Park |
| 2019/0178944 A1 | 6/2019 | Rango et al. |
| 2019/0181426 A1 | 6/2019 | Park et al. |
| 2019/0181431 A1 | 6/2019 | Canton |
| 2019/0181440 A1 | 6/2019 | Park et al. |
| 2019/0181441 A1 | 6/2019 | Ji et al. |
| 2019/0181491 A1 | 6/2019 | Park et al. |
| 2019/0181492 A1 | 6/2019 | Liu et al. |
| 2019/0181500 A1 | 6/2019 | Ji et al. |
| 2019/0181501 A1 | 6/2019 | Ji et al. |
| 2019/0181502 A1 | 6/2019 | Ji et al. |
| 2019/0190069 A1 | 6/2019 | Ji et al. |
| 2019/0190070 A1 | 6/2019 | Ji et al. |

FOREIGN PATENT DOCUMENTS

| | | |
|---|---|---|
| EP | 0949702 | 10/1999 |
| EP | 1054462 | 11/2000 |
| EP | 1722429 | 11/2006 |
| EP | 2113955 | 11/2009 |
| EP | 2400583 | 12/2011 |
| GB | 2483372 | 3/2012 |
| JP | 2000106218 | 4/2000 |
| JP | 2000133274 | 5/2000 |
| JP | 2000173667 | 6/2000 |
| JP | 2000272911 | 10/2000 |
| JP | 2001006682 | 1/2001 |
| JP | 2002151157 | 5/2002 |
| JP | 2002246013 | 8/2002 |
| JP | 2002367601 | 12/2002 |
| JP | 2003165715 | 6/2003 |
| JP | 2004006285 | 1/2004 |
| JP | 2004095198 | 3/2004 |
| JP | 2004013405 | 4/2004 |
| JP | 2004327319 | 11/2004 |
| JP | 2005158721 | 6/2005 |
| JP | 2007073334 | 3/2007 |
| JP | 2007123141 | 5/2007 |
| JP | 2007165061 | 6/2007 |
| JP | 2007531245 | 11/2007 |
| JP | 2008153006 | 7/2008 |
| JP | 2009026760 | 2/2009 |
| JP | 2009176540 | 8/2009 |
| JP | 2010146901 | 7/2010 |
| JP | 2012014866 | 1/2012 |
| JP | 2012028322 | 2/2012 |
| JP | 2012527085 | 11/2012 |
| JP | 2012252962 | 12/2012 |
| JP | 2013045759 | 3/2013 |
| JP | 2017107851 | 6/2017 |
| KR | 20090109225 | 10/2009 |
| WO | 98028804 | 7/1998 |
| WO | 2010092977 | 8/2010 |
| WO | 2011088472 | 7/2011 |
| WO | 2012050407 | 4/2012 |
| WO | 2014163986 | 10/2014 |

OTHER PUBLICATIONS

Cui et al., Inorganic Glue Enabling High Performance of Silicon Particles as Lithium Ion Battery Anode, Journal of the Electrochemical Society, 2011, vol. 158, No. 5, A592-A596.

Datta et al., Silicon, Graphite and Resin Based Hard Carbon Nanocomposite Anodes for Lithium Ion Batteries, Journal of Power Sources, Feb. 10, 2007, vol. 165, No. 1, pp. 368-378.

Du et al., Electrochemistry of CuxSi1-x Alloys in Li Cells, Journal of the Electrochemical Society, 2016, vol. 163, No. 7. pp. A1275-A1279.

International Search Report and Written Opinion for International Application No. PCT/US2014/019669, dated Aug. 28, 2014, 13 pages.

International Preliminary Report on Patentability and Written Opinion for International Application No. PCT/US2014/019669, dated Sep. 24, 2015, 10 pages.

Ji et al., Electrospun Carbon Nanofibers Containing Silicon Particles as an Energy-Storage Medium, Carbon, Nov. 2009, vol. 47, No. 14, pp. 3219-3226.

Lee et al., Graphene-Silicon Composite for Li-Ion Battery Anodes, http://apps.aiche.org/proceedings/Abstracts.aspx?PaperID=162914, dated Sep. 11, 2009, [Retrieved Jun. 23, 2011].

Li et al., Copper Deposition and Thermal Stability Issues in Copper-Based Metallization for ULSI Technology, Materials Science Reports, vol. 9, No. 1, 1992, pp. 1-51.

Ludwig et al., Solvent-Free Manufacturing of Electrodes for Lithium-Ion Batteries, Scientific Reports, Mar. 17, 2016, 6:23150, pp. 1-10.

Ma et al., Si-Based Anode Materials for Li-Ion Batteries: A Mini Review, Nano-Micro Letters, 2014, vol. 6, No. 4, pp. 347-358.

Mazouzi et al., Very High Surface Capacity Observed Using Si Negative Electrodes Embedded in Copper Foam as 3D Current Collectors, Advanced Energy Materials, 2014, vol. 4, 1301718, pp. 1-13.

Sufryd et al., Experimental Investigation of the Cu-Si Phase Diagram at x(Cu)>0.72, Intermetallics, 2011, vol. 19, pp. 1479-1488.

Wolf, H. et al., Carbon-Fiber-Silicon Nanocomposites for Lithium-Ion Battery Anodes by Microwave Plasma Chemical Vapor Deposition, Journal of Power Sources, May 1, 2009, vol. 190, No. 1, pp. 157-161.

International Preliminary Report on Patentability and Written Opinion of the International Searching Authority, PCT/US2018/064287, dated Jun. 18, 2020, 7 pages.

Kamali et al.,, Review on Carbon and Silicon Based Materials as Anode Materials for Lithium Ion Batteries, Journal of New Materials for Electrochemical Systems, 2010, vol. 13, pp. 147-160.

International Search Report and Written Opinion for International Application No. PCT/US2018/064287, dated Feb. 12, 2019, 10 pages.

Ao et al., Engineered Si Sandwich Electrode: Si Nanoparticles/ Graphite Sheet Hybrid on Ni Foam for Next-Generation High-Performance Lithium-Ion Batteries, Acs Applied Materials & Interfaces, 2015, vol. 7, No. 3, pp. 693-1698.

* cited by examiner

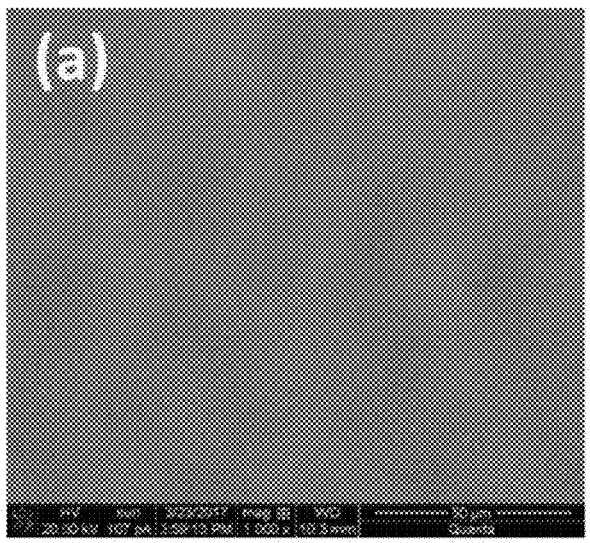 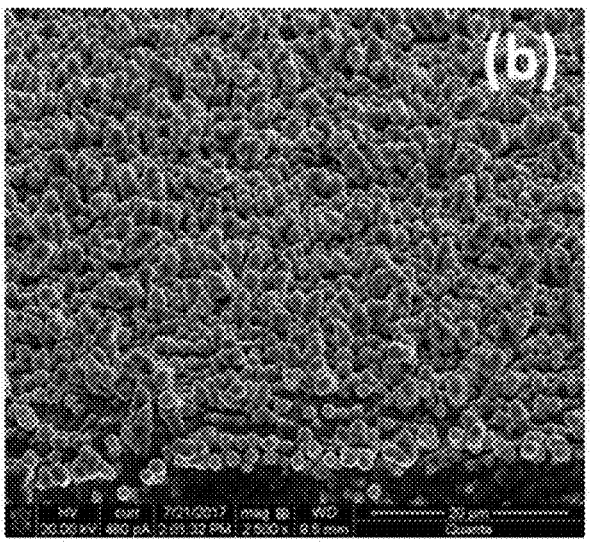
FIG. 14A  FIG. 14B
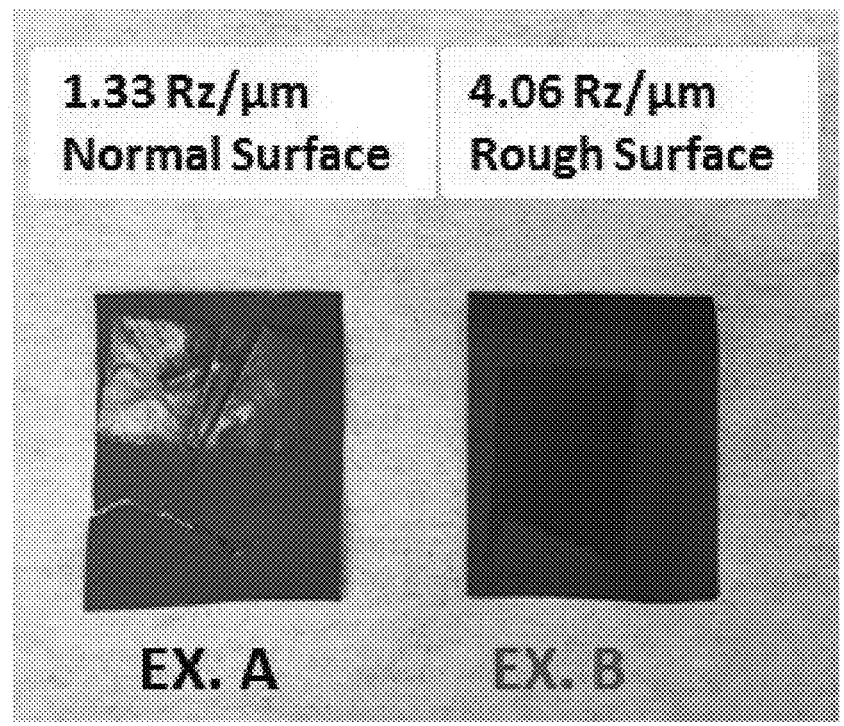
FIG. 15

BINDING AGENTS FOR ELECTROCHEMICALLY ACTIVE MATERIALS AND METHODS OF FORMING THE SAME

CROSS-REFERENCE TO RELATED APPLICATIONS

This application is a continuation of and claims the benefit of U.S. application Ser. No. 17/484,706 filed Sep. 24, 2021, pending (now allowed), which is a continuation of and claims the benefit of U.S. application Ser. No. 15/995,002 filed May 31, 2018, (now U.S. Pat. No. 11,133,498), which claims the benefit of U.S. Provisional Application No. 62/596,077, filed Dec. 7, 2017. The entirety of the above referenced applications are hereby incorporated by reference.

BACKGROUND

Field of the Invention

The present disclosure relates to electrodes, electrochemical cells, and methods of forming electrodes and electrochemical cells. In particular, the present disclosure relates to binding agents for electrochemically active materials.

Description of the Related Art

A lithium ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. For the cathode, separator and anode to be rolled, each sheet must be sufficiently deformable or flexible to be rolled without failures, such as cracks, breaks, mechanical failures, etc. Typical electrodes include electro-chemically active material layers on electrically conductive metals (e.g., aluminum and copper). For example, carbon can be deposited onto a current collector along with an inactive binder material. Carbon is often used because it has excellent electrochemical properties and is also electrically conductive. Electrodes can be rolled or cut into pieces which are then layered into stacks. The stacks are of alternating electro-chemically active materials with the separator between them.

SUMMARY

Example electrodes are provided. The electrode can include a current collector, a composite material in electrical communication with the current collector, and at least one phase between the composite material and the current collector. The current collector can include one or more layers of metal. The composite material can include from greater than 0% to about 99% by weight of electrochemically active material. The at least one phase can be configured to adhere the composite material to the current collector. In addition, the at least one phase can include a compound of the metal and the electrochemically active material.

In various electrodes, the current collector can comprise copper, nickel, iron, titanium, molybdenum, stainless steel, chromium, aluminum, or a combination thereof. The electrochemically active material can comprise silicon, graphite, germanium, tin, silicon oxide (SiOx), aluminum, or a combination thereof. In some instances, the compound can include a metal silicide. For example, the metal silicide can comprise copper silicide, nickel silicide, chromium silicide, aluminum silicide, titanium silicide, or a combination thereof.

In some electrodes, the current collector can have a surface roughness from about 0.025 Rz/μm to about 25 Rz/μm. For example, the current collector can have a surface roughness from about 1.5 Rz/μm to about 25 Rz/μm. As another example, the current collector can have a surface roughness from about 3 Rz/μm to about 25 Rz/μm.

Some electrodes can further comprise at least one second phase within the composite material. The at least one second phase can be configured to bind electrochemically active particles of the electrochemically active material together. The composite material can comprise particles of a second metal, and the at least one second phase can comprise a compound of the second metal and the electrochemically active material. In some instances, the second metal can comprise copper, nickel, iron, titanium, molybdenum, stainless steel, chromium, aluminum, or a combination thereof. The at least one second phase can comprise a metal silicide. For example, the metal silicide can comprise copper silicide, nickel silicide, chromium silicide, aluminum silicide, titanium silicide, or a combination thereof.

In some electrodes, the composite material can further include from greater than 0% to about 95% by weight of one or more types of carbon phases. The electrochemically active material can include silicon particles. The electrode can further comprise a metal silicide phase configured to bind the silicon particles together and/or the silicon particles to the one or more types of carbon phases. The metal silicide phase can include copper silicide, nickel silicide, chromium silicide, aluminum silicide, titanium silicide, or a combination thereof.

In some electrodes, the electrochemically active material can comprise silicon particles from about 50% to about 99% by weight. For example, the electrochemically active material can comprise the silicon particles from about 60% to about 99% by weight. As another example, the electrochemically active material can comprise the silicon particles from about 70% to about 99% by weight. In some instances, the electrode can be a negative electrode.

Example electrochemical cells are also provided. The electrochemical cell can include any of the electrodes described herein. The electrochemical cell can include a lithium ion battery, a magnesium battery, an aluminum battery, a sodium battery, or a combination thereof.

Example methods of forming an electrode are provided. The method can include providing a current collector comprising one or more layers of metal, providing a precursor comprising from greater than 0% to about 99% by weight of electrochemically active material, and heating the precursor and the current collector to form a composite material and at least one phase between the composite material and the current collector. The at least one phase can be configured to adhere the composite material to the current collector. The at least one phase can comprise a compound of the metal and the electrochemically active material.

In some examples, the current collector can comprise copper, nickel, iron, titanium, molybdenum, stainless steel, chromium, aluminum, or a combination thereof. The electrochemically active material can comprise silicon, graphite, germanium, tin, silicon oxide (SiOx), aluminum, or a combination thereof. In some instances, the compound can comprise a metal silicide. For example, the metal silicide can include copper silicide, nickel silicide, chromium silicide, aluminum silicide, titanium silicide, or a combination thereof.

In some instances, the current collector can have a surface roughness from about 0.025 Rz/μm to about 25 Rz/μm. As an example, the surface roughness can be from about 1.5 Rz/μm to about 25 Rz/μm. As another example, the surface roughness can be from about 3 Rz/μm to about 25 Rz/μm.

In some methods, providing the precursor can include coating a mixture on the current collector and drying the mixture. Heating the precursor and the current collector can include heating at a temperature from about 300° C. to about 900° C. For example, the temperature can be from about 650° C. to about 900° C. Heating the precursor and the current collector can include forming at least one second phase within the composite material.

In various methods, providing the precursor can comprise providing metal particles of a second metal within the precursor. The metal particles can include copper, nickel, iron, titanium, molybdenum, stainless steel, chromium, aluminum, or a combination thereof. The at least one second phase can comprise a compound of the second metal and the electrochemically active material. The compound can be configured to bind electrochemically active particles of the electrochemically active material together. The at least one second phase can comprise a metal silicide. For example, the metal silicide can include copper silicide, nickel silicide, chromium silicide, aluminum silicide, titanium silicide, or a combination thereof.

In some instances, the composite material can comprise from greater than 0% to about 95% by weight of one or more types of carbon phases. In some instances, the electrochemically active material can comprise silicon particles.

In some methods, heating the precursor and the current collector can further comprise forming a metal silicide phase configured to bind the silicon particles together and/or the silicon particles to the one or more types of carbon phases. The metal silicide phase can comprise copper silicide, nickel silicide, chromium silicide, aluminum silicide, titanium silicide, or a combination thereof.

In some examples, the electrochemically active material can comprise silicon particles from about 50% to about 99% by weight. For example, the electrochemically active material can comprise the silicon particles from about 60% to about 99% by weight. As another example, the electrochemically active material can comprise the silicon particles from about 70% to about 99% by weight.

Example composite materials are also provided. The composite material can include from greater than 0% to about 99% by weight of electrochemically active material. The composite material can also include at least one phase between electrochemically active particles of the electrochemically active material. The at least one phase can be configured to bind the electrochemically active particles together. The at least one phase can comprise a compound of metal and the electrochemically active material.

In some examples, the electrochemically active material can comprise silicon, graphite, germanium, tin, silicon oxide (SiOx), aluminum, or a combination thereof. The metal can comprise copper, nickel, iron, titanium, molybdenum, stainless steel, chromium, aluminum, or a combination thereof. The at least one phase can comprise a metal silicide phase. For example, the metal silicide phase can include copper silicide, nickel silicide, chromium silicide, aluminum silicide, titanium silicide, or a combination thereof.

Some composite materials can further include from greater than 0% to about 95% by weight of one or more types of carbon phases. The electrochemically active material can comprise silicon particles. The at least one phase can include a metal silicide phase configured to bind the silicon particles together and/or the silicon particles to the one or more types of carbon phases. The metal silicide phase can include copper silicide, nickel silicide, chromium silicide, aluminum silicide, titanium silicide, or a combination thereof.

In some instances, the electrochemically active material can include silicon particles from about 50% to about 99% by weight. For example, the electrochemically active material can include the silicon particles from about 60% to about 99% by weight. As another example, the electrochemically active material can include the silicon particles from about 70% to about 99% by weight.

Example electrodes which comprise any of the composite materials described herein can also be provided. The electrode can further include a current collector. The electrode can be a negative electrode.

Example electrochemical cells which comprise any of the composite materials described herein are also provided. The electrochemical cell can include a lithium ion battery, a magnesium battery, an aluminum battery, a sodium battery, or a combination thereof.

Example methods of forming composite material are also provided. The method can include providing a precursor comprising from greater than 0% to about 99% by weight of electrochemically active material, providing particles of a metal within the precursor, and heating the precursor comprising the electrochemically active material and the metal particles to form at least one phase between electrochemically active particles of the electrochemically active material. The at least one phase can be configured to bind the electrochemically active particles together. The at least one phase can comprise a compound of the metal and the electrochemically active material.

In some methods, heating can comprise heating at a temperature from about 300° C. to about 900° C. For example, the temperature can be from about 650° C. to about 900° C. In some implementations, the electrochemically active material can comprise silicon, graphite, germanium, tin, silicon oxide (SiOx), aluminum, or a combination thereof. In some methods, providing metal particles can include providing copper, nickel, iron, titanium, molybdenum, stainless steel, chromium, aluminum, or a combination thereof. The at least one phase can comprise metal silicide. For example, the metal silicide phase can include copper silicide, nickel silicide, chromium silicide, aluminum silicide, titanium silicide, or a combination thereof.

Providing metal particles can include providing the metal particles in an amount from greater than 0% to about 30% by weight of the precursor. The precursor can include from greater than 0% to about 95% by weight of one or more types of carbon phases. In some examples, the electrochemically active material can comprise silicon particles. The at least one phase can include a metal silicide phase configured to bind the silicon particles together and/or the silicon particles to the one or more types of carbon phases. In some examples, the metal silicide phase comprises copper silicide, nickel silicide, chromium silicide, aluminum silicide, titanium silicide, or a combination thereof.

In some instances, the precursor can comprise the silicon particles from about 50% to about 99% by weight. For example, the precursor can include the silicon particles from about 60% to about 99% by weight. As another example, the precursor can include the silicon particles from about 70% to about 99% by weight.

In some methods, providing the precursor can include providing the precursor on a current collector. Heating the precursor can include heating the precursor on the current collector.

BRIEF DESCRIPTION OF THE DRAWINGS

FIG. 14A and FIG. 14B are SEM images of copper substrates with a surface roughness of 1.33 Rz/μm and 4.06 Rz/μm respectively.

FIG. 15 shows two copper substrates with different surface roughness after an adhesion test.

DETAILED DESCRIPTION

Figure 1:
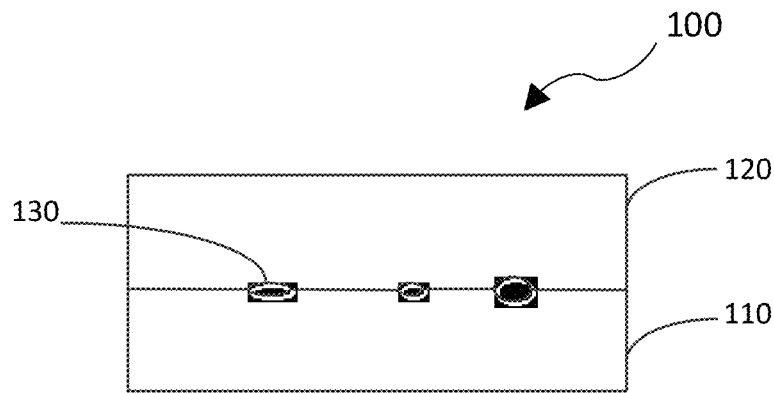
FIG. 1 schematically illustrates an example electrode in accordance with certain embodiments described herein.

This application describes certain embodiments of electrodes (e.g., anodes and cathodes) and electrochemical cells. The electrodes and electrochemical cells can include a composite material comprising electrochemically active material. In some embodiments, the composite material may include carbonized polymer and silicon material. For example, a mixture that includes a carbon precursor including silicon material can be formed into a composite material. This mixture can include both carbon and silicon and thus can be referred to as a carbon-silicon composite material, a silicon-carbon composite material, a carbon composite material, or a silicon composite material.

Typical carbon anode electrodes include a current collector such as a copper sheet. Carbon is deposited onto the collector along with an inactive binder material. Carbon is often used because it has excellent electrochemical properties and is also electrically conductive. Anode electrodes used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. Silicon, however, swells in excess of 300% upon lithiation. Because of this expansion, anodes including silicon may expand/contract and lose electrical contact to the rest of the anode. Accordingly batteries with silicon anodes exhibit more rapid capacity loss upon cycling than those batteries with graphite anodes. The repeated expansion and contraction of silicon particles during charge and discharge can lead to mechanical failure of the anode during cycling, including disconnection between silicon and carbon, silicon and current collectors, as well as the disconnection between silicon particles. Therefore, a silicon anode should be designed to be able to expand while maintaining good electrical contact with the rest of the electrode.

Polymer binders have been used to provide adhesion between silicon particles and metal current collectors (e.g., copper current collectors) and cohesion between the silicon particles. Polyimide polymers can be used as a binder in silicon-carbon anodes after high temperature curing above 300° C. In some instances, heat treatment at a higher temperature may be desired to improve Coulombic efficiency by reducing the side reactions. However, the high temperature curing may weaken adhesion between the anode film and the metal current collector, e.g., because the polymer can partially decompose upon the heat treatment.

Various embodiments described herein include introducing at least one phase to advantageously improve adhesion between an electrochemically active composite material and a current collector. In addition, various embodiments described herein can include at least one phase to advantageously improve cohesion between electrochemically active particles and/or between electrochemically active particles and other materials in a composite material (e.g., between silicon particles and/or between silicon particles and carbon phases).

Adhesion Between Composite Material and Current Collector

FIG. 1 schematically illustrates an example electrode in accordance with certain embodiments described herein. The electrode 100 can be used as a negative electrode (e.g., an anode), a positive electrode (e.g., a cathode), or both. Various embodiments of the electrode 100 can be used in either secondary batteries (e.g., rechargeable) or primary batteries (e.g., non-rechargeable). The electrochemical cell can include a lithium ion battery, a magnesium battery, an aluminum battery, a sodium battery, or a combination thereof.

With continued reference to FIG. 1, the example electrode 100 can include a current collector 110, a composite material 120, and at least one phase 130 configured to adhere (or enhance adhesion of or provide additional adhesion of) the composite material 120 to the current collector 110. The current collector can include any current collector known in the art or yet to be developed. In various embodiments, the current collector 110 can include one or more layers of metal. For example, the current collector 110 can include a foil or a clad foil. As another example, the current collector 110 can include one or more metal coatings (e.g., a layer of metal disposed on the current collector). Example metals include, but are not limited to, copper, nickel, iron, titanium, molybdenum, stainless steel, chromium, aluminum, or a combination thereof.

In various embodiments, the composite material 120 can be in electrical communication with the current collector 110. The composite material 120 can include electrochemically active material. In some embodiments, the composite material 120 can include from greater than 0% to about 99% by weight of electrochemically active material. For example, the amount of electrochemically active material by weight of the composite material can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, etc.), or any range within this range such as any range formed by the example values (e.g., greater than about 0% to about 25% by weight, greater than about 0% to about 35% by weight, greater than about 0% to about 50% by weight, greater than about 0% to about 70% by weight, greater than about 0% to about 90% by weight, greater than about 0% to about 95% by weight, from about 10% to about 35% by weight, from about 10% to about 50% by weight, from about 10% to about 90% by weight, from about 10% to about 95% by weight, from about 10% to about 99% by weight, from about 30% to about 85% by weight, from about 30% to about 90% by weight, from about 30% to about 95% by weight, from about 30% to about 99% by weight, from about 50% to about 85% by weight, from about 50% to about 90% by weight, from about 50% to about 95% by weight, from about 50% to about 99% by weight, from about 60% to about 85% by weight, from about 60% to about 90% by weight, from about 60% to about 95% by weight, from about 60% to about 99% by weight, from about 70% to about 85% by weight, from about 70% to about 90% by weight, from about 70% to about 95% by weight, from about 70% to about 99% by weight, etc.).

The electrochemically active material can include any electrochemically active material. For example, the electrochemically active material can include silicon, graphite, germanium, tin, silicon oxide (SiOx), aluminum, or a combination thereof. As described herein, various embodiments can include a silicon-carbon (or carbon-silicon) composite material. U.S. patent application Ser. No. 13/008,800 (U.S. Pat. No. 9,178,208), U.S. patent application Ser. No. 13/601,976 (U.S. Patent Application Publication No. 2014/0170498), and U.S. patent application Ser. No. 13/799,405 (U.S. Pat. No. 9,553,303), each of which is incorporated by reference herein, describe certain embodiments of carbon-silicon composite materials using carbonized polymer and silicon material.

In various embodiments, at least one phase 130 can be between the composite material 120 and the current collector 110. FIG. 1 schematically illustrates phase 130 with a cross-sectional shape similar to an oval. However, the shape, size, number, and/or distribution of phase 130 are not particularly limited.

As described herein, phase 130 can act as a binding agent or binding material. For example, phase 130 can be configured to adhere (or enhance adhesion or provide additional adhesion of) the composite material 120 to the current collector 110. In some embodiments, other binding agents or binding material (e.g., polymer) can be used to enhance the bonding. For example, in some instances, phase 130 can provide the main binding mechanism and another binder may also be used. Phase 130 can include a compound of the metal of the current collector 110 and the electrochemically active material of the composite material 120. Without being bound by theory, phase 130 can be formed (e.g., grown) via a heat treatment that may facilitate diffusion and/or reactions between the metal of the current collector 110 (or a metal disposed on the current collector 110) and the electrochemically active material of the composite material 120 at the interface, without adversely affecting the current collector and/or the electrochemically active material (e.g., without facilitating reactions that may destroy the current collector and/or pulverize the electrochemically active material). For example, in some instances, the amount of reaction between the electrochemically active material and the current collector 110 and/or the depth of the current collector 110 that reacts with the electrochemically active material (e.g., the reaction depth) can be about 10% or less (e.g., about 1%, about 2%, about 3%, about 4%, about 5%, about 6%, about 7%, about 7.5%, about 8%, about 9%, about 10%, etc.) or any range formed by such example values (e.g., from about 1% to about 5%, from about 1% to about 7.5%, from about 1% to about 10%, from about 2% to about 5%, from about 2% to about 7.5%, from about 2% to about 10%, from about 3% to about 5%, from about 3% to about 7.5%, from about 3% to about 10%, from about 5% to about 10%, from about 7.5% to about 10%, etc.) As an example, a composite material 120 can be coated on a metal current collector 110, and heated in a range from about 300° C. to about 900° C. for a duration of about 24 hours to form phase 130 comprising a compound of the metal of the current collector 110 and the electrochemically active material of the composite material 120. For carbon-silicon composite materials (e.g., composite materials comprising silicon) on a copper or nickel foil, phase 130 comprising a metal silicide (e.g., copper silicide or nickel silicide) can form. Other example metal silicides can include chromium silicide, aluminum silicide, and/or titanium silicide (e.g., with chromium, aluminum, and/or titanium current collectors).

In some embodiments, phase 130 can form when the electrochemically active material and the metal of the current collector 110 are in physical contact with each other. Surfaces with relatively high surface area can provide more contact points. Without being bound by theory, an increase in the number of contact points between the electrochemically active material and the current collector can promote reactions and further improve adhesion. In some embodiments, the current collector 110 can have a surface roughness from about 0.025 Rz/μm to about 25 Rz/μm. For example, the current collector 110 can have a surface roughness within this range (e.g., about 0.025 Rz/μm, about 1 Rz/μm, about 1.5 Rz/μm, about 2 Rz/μm, about 2.5 Rz/μm, 3 Rz/μm, about 3.5 Rz/μm, about 4 Rz/μm, about 4.5 Rz/μm, etc.), or any range within this range such as any range formed by the example values (e.g., greater than about 0.03 Rz/μm to about 25 Rz/μm, greater than about 0.05 Rz/μm to about 25 Rz/μm, greater than about 1 Rz/μm to about 25 Rz/μm, greater than about 1.5 Rz/μm to about 25 Rz/μm, greater than about 2 Rz/μm to about 25 Rz/μm, greater than about 2.5 Rz/μm to about 25 Rz/μm, greater than about 3 Rz/μm to about 25 Rz/μm, greater than about 3.5 Rz/μm to about 25 Rz/μm, greater than about 4 Rz/μm to about 25 Rz/μm, etc.). In some embodiments, a current collector with a relatively high surface area (e.g., due to the surface roughness) can increase the number of contact points.

Figure 2:
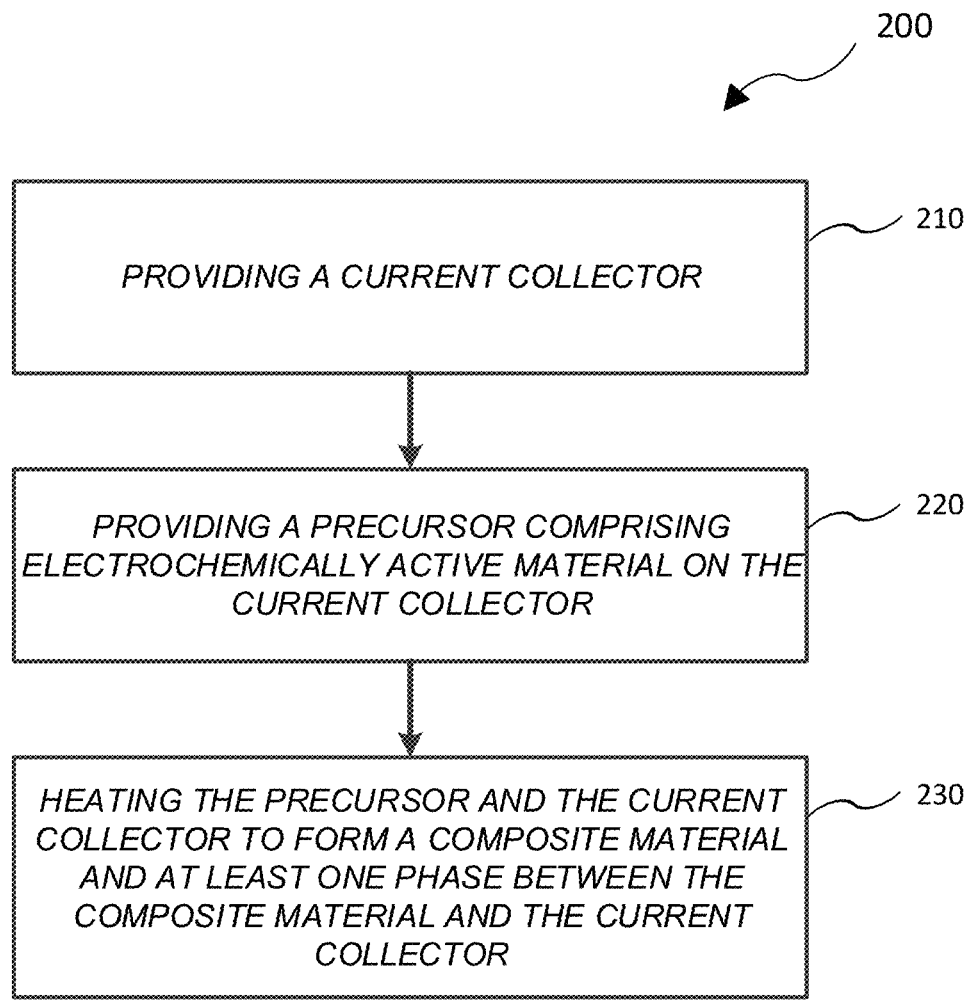
FIG. 2 illustrates an example method of forming an electrode.

FIG. 2 illustrates an example method of forming an electrode (e.g., the electrode 100 schematically illustrated in FIG. 1). The method 200 of forming can include providing a current collector (as shown in block 210), providing a precursor comprising electrochemically active material on the current collector (as shown in block 220), and heating the precursor and the current collector to form a composite material and at least one phase between the composite material and the current collector (as shown in block 230).

With reference to block 210, the provided current collector can include any of the current collectors described herein. With reference to block 210, the provided precursor can include from greater than 0% to about 99% by weight of electrochemically active material. For example, the amount of electrochemically active material by weight of the precursor can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, etc.), or any range within this range such as any range formed by the example values (e.g., greater than about 0% to about 25% by weight, greater than about 0% to about 35% by weight, greater than about 0% to about 50% by weight, greater than about 0% to about 90% by weight, greater than about 0% to about 95% by weight, from about 10% to about 35% by weight, from about 10% to about 50% by weight, from about 10% to about 90% by weight, from about 10% to about 95% by weight, from about 10% to about 99% by weight, from about 30% to about 85% by weight, from about 30% to about 90% by weight, from about 30% to about 95% by weight, from about 30% to about 99% by weight, from about 50% to about 85% by weight, from about 50% to about 90% by weight, from about 50% to about 95% by weight, from about 50% to about 99% by weight, from about 60% to about 85% by weight, from about 60% to about 90% by weight, from about 60% to about 95% by weight, from about 60% to about 99% by weight, from about 70% to about 85% by weight, from about 70% to about 90% by weight, from about 70% to about 95% by weight, from about 70% to about 99% by weight, etc.). The electrochemically active material can include any electrochemically active material as described herein, including but not limited to silicon, graphite, germanium, tin, silicon oxide (SiOx), aluminum, or a combination thereof.

The precursor can include any of the precursors for carbon-silicon composite materials as described in U.S. patent application Ser. No. 13/008,800, U.S. patent application Ser. No. 13/601,976, and U.S. patent application Ser. No. 13/799,405, each of which is incorporated by reference herein. As an example, the electrochemically active material can include various types of silicon materials, including but not limited to silicon powders, silicon fibers, porous silicon, ball-milled silicon, etc. In some embodiments, a mixture of the precursor can be coated on the current collector and dried.

With reference to block 230, the method 200 can also include heating the precursor and the current collector to form a composite material and at least one phase between the composite material and the current collector. The mixture of the precursor on the current collector can be heated at a temperature from about 300° C. to about 900° C., from about 400° C. to about 900° C., from about 500° C. to about 900° C., from about 600° C. to about 900° C., from about 650° C. to about 900° C., etc. In some instances, a higher temperature may have a lower processing time. In some instances, a lower temperature may have a higher processing time. The process to convert the precursor into a composite material and/or the formed composite material can be any of those described herein or in U.S. patent application Ser. No. 13/008,800, U.S. patent application Ser. No. 13/601,976, and U.S. patent application Ser. No. 13/799,405. For example, the precursor can be a mixture that is pyrolyzed to form a carbon-silicon composite material. The phase that forms can include any phase described herein (e.g., a compound of the metal of the current collector and the electrochemically active material of the composite material). As described herein, the phase can act as a binding material to adhere (or improve adhesion or provide additional adhesion) between the composite material and the current collector. Compared to some processes described in U.S. patent application Ser. No. 13/008,800, U.S. patent application Ser. No. 13/601,976, and U.S. patent application Ser. No. 13/799, 405, some embodiments described herein can pyrolyze the composite material at a lower temperature to control the reactions between the current collector and the electrochemically active material of the composite material. In some instances, the amount of reaction between the electrochemically active material and the current collector 110 and/or the depth of the current collector 110 that reacts with the electrochemically active material (e.g., the reaction depth) can be about 10% or less as described herein. In some instances, the carbon may not be fully pyrolyzed, e.g., some hydrogen may be remaining.

Cohesion within the Composite Material

Figure 3:
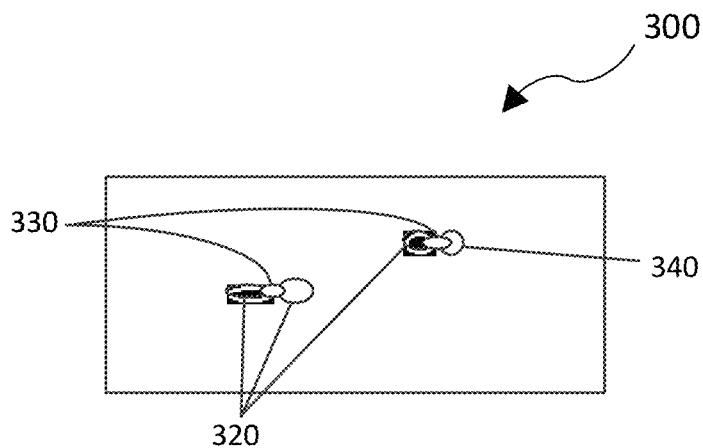
FIG. 3 schematically illustrates an example composite material in accordance with certain embodiments described herein.

FIG. 3 schematically illustrates an example composite material in accordance with certain embodiments described herein. As described herein, the composite material 300 can include electrochemically active material 320. In some embodiments, the composite material 300 can include from greater than 0% to about 99% by weight of electrochemically active material 320. For example, the amount of electrochemically active material 320 by weight of the composite material 300 can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, etc.), or any range within this range such as any range formed by the example values (e.g., greater than about 0% to about 25% by weight, greater than about 0% to about 35% by weight, greater than about 0% to about 50% by weight, greater than about 0% to about 90% by weight, greater than about 0% to about 95% by weight, from about 10% to about 35% by weight, from about 10% to about 50% by weight, from about 10% to about 90% by weight, from about 10% to about 95% by weight, from about 10% to about 99% by weight, from about 30% to about 85% by weight, from about 30% to about 90% by weight, from about 30% to about 95% by weight, from about 30% to about 99% by weight, from about 50% to about 85% by weight, from about 50% to about 90% by weight, from about 50% to about 95% by weight, from about 50% to about 99% by weight, from about 60% to about 85% by weight, from about 60% to about 90% by weight, from about 60% to about 95% by weight, from about 60% to about 99% by weight, from about 70% to about 85% by weight, from about 70% to about 90% by weight, from about 70% to about 95% by weight, from about 70% to about 99% by weight, etc.). The electrochemically active material 320 can include any of the electrochemically active materials 320 described herein, including but not limited to silicon, graphite, germanium, tin, silicon oxide (SiOx), aluminum, or a combination thereof.

In various embodiments, at least one phase 330 can be between electrochemically active particles of the electrochemically active material 320. In some embodiments, at least one phase 330 can be between the electrochemically active particles of the electrochemically active material 320 and other materials 340 in the composite material 300. FIG. 3 schematically illustrates phase 330 with a cross-sectional shape similar to an oval. However, the shape, size, number, and/or distribution of phase 330 are not particularly limited.

As described herein, phase 330 can be configured to bind together (or improve binding of or provide additional binding of) the electrochemically active particles of the electrochemically active material 320. As also described herein, phase 330 can be configured to bind (or improve binding of or provide additional binding of) the electrochemically active particles of the electrochemically active material 320 and other materials 340 in the composite material 300. As an example, in carbon-silicon composite material (e.g., any of the carbon-silicon composite materials described herein), phase 330 can be configured to bind or help bind silicon together and/or silicon and carbon together.

In some embodiments, metal particles (e.g., powders) can be added to a precursor comprising the electrochemically active material 320. When the precursor is heated to form the composite material 300, at least one phase 330 can form between the materials in the composite material 300 (e.g., between electrochemically active particles of the electrochemically active material 320 and/or between the electrochemically active particles of the electrochemically active material 320 and other materials in the composite material 300). Phase 330 can include a compound of the added metal (e.g., from the metal particles) and the electrochemically active material. The metals can include various metals including but not limited to copper, nickel, iron, titanium, molybdenum, stainless steel, chromium, aluminum, or a combination thereof.

For carbon-silicon composite materials (e.g., composite materials comprising silicon), phase 330 comprising a metal silicide can form. Example metal silicides can include copper silicide, nickel silicide, chromium silicide, aluminum silicide, titanium silicide, or a combination thereof (e.g., with copper, nickel, chromium, aluminum, and/or titanium particles).

In various embodiments, the composite material 300 can be used in an electrode and/or electrochemical cell. For example, as described herein (e.g., with reference to FIG. 1), composite material can be in electrical communication with a current collector 110. At least one phase 130 can be configured to adhere (or improve adhesion of or provide additional adhesion of) the composite material 120 to the current collector 110. The electrode can be used as a negative or positive electrode in electrochemical cells. Various embodiments can be used in secondary or primary batteries. The electrochemical cell can include a lithium ion battery, a magnesium battery, an aluminum battery, a sodium battery, or a combination thereof.

Figure 4:
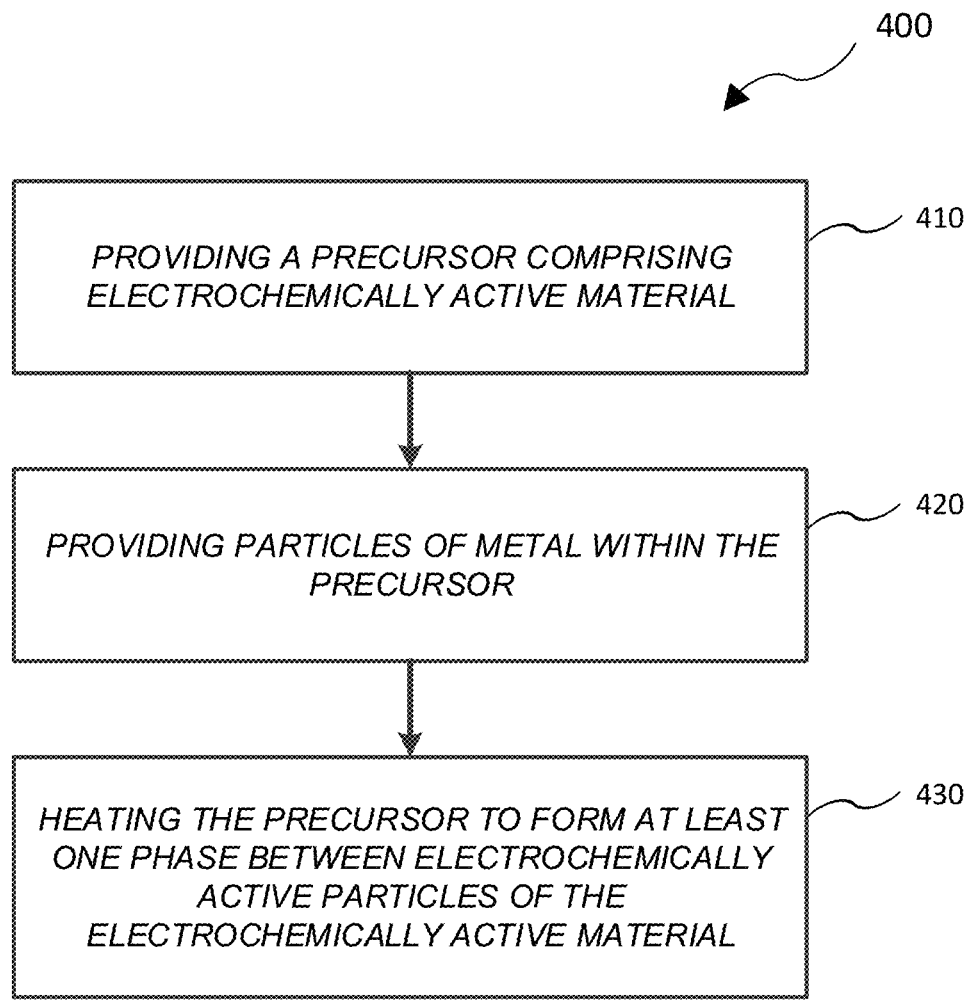
FIG. 4 illustrates an example method of forming a composite material.

FIG. 4 illustrates an example method of forming a composite material (e.g., the composite material 300 schematically illustrated in FIG. 3). The method 400 of forming can include providing a precursor comprising electrochemically active material (as shown in block 410), providing particles of metal within the precursor (as shown in block 420), and heating the precursor to form at least one phase between the electrochemically active particles of the electrochemically active material (as shown in block 430). With reference to block 410, the provided precursor can include any precursor described herein (e.g., the provided precursor discussed with reference to FIG. 2) or any of the precursors for carbon-silicon composite materials as described in U.S. patent application Ser. No. 13/008,800, U.S. patent application Ser. No. 13/601,976, and U.S. patent application Ser. No. 13/799,405. The electrochemically active material can include any electrochemically active material as described herein, including but not limited to silicon, graphite, germanium, tin, silicon oxide (SiOx), aluminum, or a combination thereof.

With reference to block 420, the metal can include any of the metals described herein, including but not limited to copper, nickel, iron, titanium, molybdenum, stainless steel, chromium, aluminum, or a combination thereof. In some embodiments, the precursor can include from greater than 0% to about 30% by weight of metal particles. For example, the amount of metal particles by weight of the precursor can include any weight percent within this range (e.g., about 1%, about 2%, about 3%, about 4%, about 5%, about 7%, about 10%, about 15%, about 20%, about 25%, about 30%, etc.), or any range within this range such as any range formed by the example values (e.g., greater than about 0% to about 5% by weight, greater than about 0% to about 10% by weight, greater than about 0% to about 15% by weight, greater than about 0% to about 20% by weight, greater than about 0% to about 25% by weight, from about 1% to about 5% by weight, from about 1% to about 10%, from about 1% to about 15%, from about 1% to about 20%, from about 1% to about 25%, from about 1% to about 30% by weight, from about 2% to about 5% by weight, from about 2% to about 10%, from about 2% to about 15%, from about 2% to about 20%, from about 2% to about 25%, from about 2% to about 30% by weight, from about 5% to about 10% by weight, from about 5% to about 15%, from about 5% to about 20%, from about 5% to about 25%, from about 5% to about 30% by weight, from about 10% to about 20% by weight, from about 10% to about 25% by weight, from about 20% to about 30% by weight, etc.).

With reference to block 430, heating the precursor can form at least one phase between electrochemically active particles of the electrochemically active material to bind the electrochemically active particles together and/or between the electrochemically active particles of the electrochemically active material and other material within the composite material to bind the electrochemically active particles and the other material. In some embodiments, the precursor can be heated at a temperature from about 300° C. to about 900° C., from about 400° C. to about 900° C., from about 500° C. to about 900° C., from about 600° C. to about 900° C., from about 650° C. to about 900° C., etc. In some methods (e.g., without heating on a current collector), the precursor can be heated at higher temperatures. For example, in some instances, the precursor can be heated from about 900° C. to about 1350° C. In some cases, heating at a higher temperature may utilize a lower processing time; and/or heating at a lower temperature may utilize a higher processing time.

For carbon-silicon composite materials (e.g., composite materials comprising silicon), a phase comprising a metal silicide can form. Example metal silicides can include copper silicide, nickel silicide, chromium silicide, aluminum silicide, titanium silicide, or a combination thereof.

In various embodiments, the method 400 of forming a composite material shown in FIG. 4 can be part of a method of forming an electrode and/or electrochemical cell. For example, the precursor with metal particles can be provided on a current collector. The precursor and current collector can be heated to form a composite material comprising at least one phase between the electrochemically active particles of the electrochemically active material. As another example, as described herein (e.g., with reference to FIG. 2), the precursor described with respect to FIG. 4 can be provided on a current collector. The precursor and the current collector can be heated to form a composite material and at least one phase between the composite material and the current collector.

Composite Materials and Methods of Forming the Same

U.S. patent application Ser. No. 13/008,800, U.S. patent application Ser. No. 13/601,976, and U.S. patent application Ser. No. 13/799,405, each of which is incorporated by reference herein, describe certain embodiments of carbon-silicon composite materials using carbonized polymer and silicon material. The carbonized polymer can act as an expansion buffer for silicon particles during cycling so that a high cycle life can be achieved. In certain embodiments, the resulting electrode can be an electrode that is comprised substantially of active material. For example, the carbonized polymer can form a substantially continuous conductive carbon phase(s) in the entire electrode as opposed to particulate carbon suspended in a non-conductive binder in one class of conventional lithium-ion battery electrodes. Because the polymer can be converted into an electrically conductive and electrochemically active matrix, the resulting electrode can be conductive enough that a metal foil or mesh current collector may be omitted, minimized, or reduced in some embodiments. Accordingly, in U.S. patent application Ser. No. 13/008,800, application Ser. No. 13/601,976, and U.S. patent application Ser. No. 13/799,405, certain embodiments of monolithic, self-supported electrodes are disclosed. The electrodes can have a high energy density of between about 500 mAh/g to about 3500 mAh/g that can be due to, for example, 1) the use of silicon, 2) elimination or substantial reduction of metal current collectors, and 3) being comprised entirely or substantially entirely of active material.

The carbon-silicon composite material can be formed by forming a mixture including a precursor, and pyrolyzing the precursor to convert the precursor to a carbon phase. In certain embodiments, the carbon precursor is a hydrocarbon compound. For example, the precursor can include polyamideimide, polyamic acid, polyimide, etc. Other precursors include phenolic resins, epoxy resins, and other polymers. The mixture can further include a solvent. For example, the solvent can be N-methyl-pyrollidone (NMP). Other possible solvents include acetone, diethyl ether, gamma butyrolactone, isopropanol, dimethyl carbonate, ethyl carbonate, dimethoxyethane, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrollidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. In certain embodiments, the amount of precursor (e.g., solid polymer) in the solvent is about 10 wt. % to about 30 wt. %.

The mixture can include silicon particles as described herein. The mixture may comprise about 5% to about 99% by weight of the precursor, and from greater than 0% to about 99% by weight of the silicon particles (for example, at least about 20% to about 95% by weight of the silicon particles, at least about 20% to about 99% by weight of the silicon particles, etc.). Additional materials can also be included in the mixture. As an example, carbon particles including graphite active material, chopped or milled carbon fiber, carbon nanofibers, carbon nanotubes, and other conductive carbons can be added to the mixture. Conductive particles can also be added to the mixture. In addition, the mixture can be mixed to homogenize the mixture.

In certain embodiments, the mixture is cast on a substrate. In some embodiments, casting includes using a gap extrusion, tape casting, or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a substrate comprising a polymer sheet, a polymer roll, and/or foils or rolls made of glass or metal. The mixture can then be dried to remove the solvent. For example, a polyamic acid and NMP solution can be dried at about 110° C. for about 2 hours to remove the NMP solution.

In various embodiments, the substrate is a metal current collector, and the dried mixture remains on the current collector for further processing (e.g., in some embodiments providing adhesion between the composite material and the current collector and cohesion within the composite material). In some other embodiments, the dried mixture can be removed from the substrate (e.g., in some embodiments providing cohesion within the composite material). For example, an aluminum substrate can be etched away with HCl. Alternatively, the dried mixture can be removed from the substrate by peeling or otherwise mechanically removing the dried mixture from the substrate. In some embodiments, the substrate comprises polyethylene terephthalate (PET), including for example Mylar®. In certain embodiments, the dried mixture is a film or sheet.

In some embodiments, the dried mixture (on a substrate or removed from the substrate) is optionally cured. In some embodiments, the dried mixture may be further dried. For example, the dried mixture can placed in a hot press (e.g., between graphite plates in an oven). A hot press can be used to further dry and/or cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, de-ionized (DI) water can be used to rinse the dried mixture.

In certain embodiments, tape casting techniques can be used for casting on a substrate. In some embodiments, the mixture can be coated on a substrate by a slot die coating process (e.g., metering a constant or substantially constant weight and/or volume through a set or substantially set gap). In some other embodiments, there is no substrate for casting and the anode film does not need to be removed from any substrate. The dried mixture may be cut or mechanically sectioned into smaller pieces.

The mixture further goes through pyrolysis to convert the polymer precursor to carbon. In certain embodiments, the mixture is pyrolysed in a reducing atmosphere. For example, an inert atmosphere, a vacuum and/or flowing argon, nitrogen, or helium gas can be used. In some embodiments, the mixture is heated in a range from about 300° C. to about 900° C. For example, polyimide formed from polyamic acid can be carbonized at a temperature in a range from about 300° C. to about 900° C. (e.g., 600° C., 650° C., 700° C., etc.) for about one hour. In some embodiments (e.g., without a substrate/current collector), the mixture can be heated in a range from about 900° C. to about 1350° C. (e.g., at about 1175° C.). In certain embodiments, the heat up rate and/or cool down rate of the mixture is about 10° C./min. A holder may be used to keep the mixture in a particular geometry. The holder can be graphite, metal, etc. In certain embodiments, the mixture is held flat. After the mixture is pyrolysed, tabs can be attached to the pyrolysed material to form electrical contacts. For example, nickel, copper or alloys thereof can be used for the tabs.

In certain embodiments, one or more of the methods described herein can be carried out in a continuous process. In certain embodiments, casting, drying, possibly curing and pyrolysis can be performed in a continuous process. For example, the mixture can be coated onto a glass or metal cylinder. The mixture can be dried while rotating on the cylinder to create a film. The film can be transferred as a roll or peeled and fed into another machine for further processing. Extrusion and other film manufacturing techniques known in industry could also be utilized prior to the pyrolysis step.

Pyrolysis of the precursor results in a carbon material (e.g., at least one carbon phase). In certain embodiments, the carbon material is a hard carbon. In some embodiments, the precursor is any material that can be pyrolysed to form a hard carbon. When the mixture includes one or more additional materials or phases in addition to the carbonized precursor, a composite material can be created. In particular, the mixture can include silicon particles, creating a silicon-carbon (e.g., at least one first phase comprising silicon and at least one second phase comprising carbon) or silicon-carbon-carbon (e.g., at least one first phase comprising silicon, at least one second phase comprising carbon, and at least one third phase comprising carbon) composite material.

Silicon particles can increase the specific lithium insertion capacity of the composite material. When silicon absorbs lithium ions, it experiences a large volume increase on the order of 300+ volume percent which can cause electrode structural integrity issues. In addition to volumetric expansion related problems, silicon is not inherently electrically conductive, but becomes conductive when it is alloyed with lithium (e.g., lithiation). When silicon de-lithiates, the surface of the silicon losses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. A reduction in the initial size of the silicon particles can prevent further pulverization of the silicon powder as well as minimizing the loss of surface electrical conductivity. Furthermore, adding material to the composite that can elastically deform with the change in volume of the silicon particles can reduce the chance that electrical contact to the surface of the silicon is lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

As described herein, in order to increase volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, are viable candidates as active materials for the negative or positive electrode. As described herein, the amount of silicon provided in the mixture or in the composite material can be within a range from greater than about 0% to about 99% by weight of the composite material (e.g., about 20% to about 95% by weight of the composite material, about 20% to about 99% by weight of the composite material, etc.).

In some embodiments, all, substantially all, or at least some of the silicon particles may have a particle size (e.g., the diameter or the largest dimension of the particle) less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 20 µm, between about 0.5 µm and about 20 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, and about 100 nm. For example, in some embodiments, the average particle size (or the average diameter or the average largest dimension) or the median particle size (or the median diameter or the median largest dimension) of the silicon particles can be less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 20 µm, between about 0.5 µm and about 20 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, and about 100 nm. In some embodiments, the silicon particles may have a distribution of particle sizes. For example, at least about 95%, at least about 90%, at least about 85%, at least about 80%, at least about 70%, or at least about 60% of the particles may have the particle size described herein.

In certain embodiments, the silicon particles are at least partially crystalline, substantially crystalline, and/or fully crystalline. Furthermore, the silicon particles may or may not be substantially pure silicon. For example, the silicon particles may be substantially silicon or may be a silicon alloy. In one embodiment, the silicon alloy includes silicon as the primary constituent along with one or more other elements.

Advantageously, the silicon particles described herein can improve performance of electro-chemically active materials such as improving capacity and/or cycling performance. Furthermore, electro-chemically active materials having such silicon particles may not significantly degrade as a result of lithiation of the silicon particles.

The amount of carbon obtained from the precursor can be greater than 0% to about 95% by weight such as about 1% to about 95% by weight, about 1% to about 90% by weight, 1% to about 80% by weight, about 1% to about 70% by weight, about 1% to about 60% by weight, about 1% to about 50% by weight, about 1% to about 40% by weight, about 1% to about 30% by weight, about 5% to about 95% by weight, about 5% to about 90% by weight, about 5% to about 80% by weight, about 5% to about 70% by weight, about 5% to about 60% by weight, about 5% to about 50% by weight, about 5% to about 40% by weight, about 5% to about 30% by weight, about 10% to about 95% by weight, about 10% to about 90% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight, etc. For example, the amount of carbon obtained from the precursor can be about 1%, about 5%, about 10% by weight, about 15% by weight, about 20% by weight, about 25% by weight, etc. from the precursor.

The carbon from the precursor can be hard carbon. Hard carbon can be a carbon that does not convert into graphite even with heating in excess of 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. The amount of hard carbon in the composite material can be any of the ranges described herein with respect to the amount of carbon obtained from the precursor. For example, in some embodiments, the amount of hard carbon in the composite material can have a value within a range of greater than 0% to about 95% by weight such as about 1% to about 95% by weight, about 1% to about 90% by weight, about 1% to about 80% by weight, about 1% to about 70% by weight, about 1% to about 60% by weight, about 1% to about 50% by weight, about 1% to about 40% by weight, about 1% to about 30% by weight, about 5% to about 95% by weight, about 5% to about 90% by weight, about 5% to about 80% by weight, about 5% to about 70% by weight, about 5% to about 60% by weight, about 5% to about 50% by weight, about 5% to about 40% by weight, about 5% to about 30% by weight, about 10% to about 95% by weight, about 10% to about 90% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight. In some embodiments, the amount of hard carbon in the composite material can be about 1% by weight, about 5% by weight, about 10% by weight, about 20% by weight, about 30% by weight, about 40% by weight, about 50% by weight, or more than about 50% by weight. In certain embodiments, the hard carbon phase is substantially amorphous. In other embodiments, the hard carbon phase is substantially crystalline. In further embodiments, the hard carbon phase includes amorphous and crystalline carbon. The hard carbon phase can be a matrix phase in the composite material. The hard carbon can also be embedded in the pores of the additives including silicon. The hard carbon may react with some of the additives to create some materials at interfaces. For example, there may be a silicon carbide layer between silicon particles and the hard carbon.

In some embodiments, graphite is one of the types of carbon phases from the precursor. In certain embodiments, graphite particles are added to the mixture. Advantageously, graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, all, substantially all, or at least some of the graphite particles may have a particle size (e.g., a diameter or a largest dimension) between about 0.5 microns and about 20 microns. In some embodiments, an average particle size (e.g., an average diameter or an average largest dimension) or median particle size (e.g., a median diameter or a median largest dimension) of the graphite particles is between about 0.5 microns and about 20 microns. In some embodiments, the graphite particles may have a distribution of particle sizes. For example, at least about 95%, at least about 90%, at least about 85%, at least about 80%, at least about 70%, or at least about 60% of the particles may have the particle size described herein. In certain embodiments, the composite material can include graphite particles in an amount greater than 0% and less than about 80% by weight, including from 40% to about 75% by weight, from about 5% to about 30% by weight, from 5% to about 25% by weight, from 5% to about 20% by weight, or from 5% to about 15% by weight.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, all, substantially all, or at least some of the conductive particles can have a particle size (e.g., the diameter or the largest dimension) between about 10 nanometers and about 7 micrometers. In some embodiments, an average particle size (e.g., an average diameter or an average largest dimension) or a median particle size (e.g., a median diameter or a median largest dimension) of the conductive particles is between about 10 nm and about 7 micrometers. In some embodiments, the conductive particles may have a distribution of particle sizes. For example, at least about 95%, at least about 90%, at least about 85%, at least about 80%, at least about 70%, or at least about 60% of the particles may have the particle size described herein.

In certain embodiments, the mixture includes conductive particles in an amount greater than zero and up to about 80% by weight. In some embodiments, the composite material includes about 45% to about 80% by weight of conductive particles. The conductive particles can be conductive carbon including carbon blacks, carbon fibers, carbon nanofibers, carbon nanotubes, etc. Many carbons that are considered as conductive additives that are not electrochemically active become active once pyrolysed in a polymer matrix. Alternatively, the conductive particles can be metals or alloys including copper, nickel, or stainless steel. In some instances, the mixture and/or composite material can include greater than 0% to about 30% by weight of metal particles.

After the precursor is pyrolyzed, the resulting carbon material can be a self-supporting monolithic structure (e.g., if removed from the substrate). The carbonized precursor results in an electrochemically active structure that holds the composite material together. For example, the carbonized precursor can be a substantially continuous phase. Advantageously, the carbonized precursor can be a structural material as well as an electro-chemically active and electrically conductive material. In certain embodiments, material particles added to the mixture are homogenously or substantially homogeneously distributed throughout the composite material to form a homogeneous or substantially homogeneous composite.

In some embodiments, the composite material and/or electrode does not include a polymer beyond trace amounts that remain after pyrolysis of the precursor. In further embodiments, the composite material and/or electrode does not include a non-electrically conductive binder. The composite material may also include porosity. In some embodiments, the composite material (or the film) can include porosity of about 1% to about 70% or about 5% to about 50% by volume porosity. For example, the porosity can be about 5% to about 40% by volume porosity.

A current collector may be preferred in some applications, for example, where current above a certain threshold or additional mechanical support may be desired. In some such embodiments, the precursor described herein can be pyrolyzed on the current collector as described herein. U.S. patent application Ser. No. 13/333,864, filed Dec. 21, 2011, and published on Jun. 19, 2014 as U.S. Patent Application Publication No. 2014/0170482, entitled "Electrodes, Electrochemical Cells, and Methods of Forming Electrodes and Electrochemical Cells," and U.S. patent application Ser. No. 13/796,922, filed Mar. 12, 2013, and published on Jun. 19, 2014 as U.S. Patent Application Publication No. 2014/0170475, entitled "Electrodes, Electrochemical Cells, and Methods of Forming Electrodes and Electrochemical Cells," each of which is incorporated by reference herein, describe certain other embodiments of electrodes including a current collector, electrochemical cells comprising such electrodes, and methods of forming such electrodes and electrochemical cells.

In some embodiments, the full capacity of the composite material of the electrodes described herein may not be utilized during use of the battery to improve life of the battery (e.g., number charge and discharge cycles before the battery fails or the performance of the battery decreases below a usability level). For example, a composite material with about 70% by weight of silicon particles, about 20% by weight of carbon from a precursor, and about 10% by weight of graphite may have a maximum gravimetric capacity of about 3000 mAh/g, while the composite material may only be used up to an gravimetric capacity of about 550 to about 1500 mAh/g. Although, the maximum gravimetric capacity of the composite material may not be utilized, using the composite material at a lower capacity can still achieve a higher capacity than certain lithium ion batteries. In certain embodiments, the composite material is used or only used at an gravimetric capacity below about 70% of the composite material's maximum gravimetric capacity. For example, the composite material is not used at an gravimetric capacity above about 70% of the composite material's maximum gravimetric capacity. In further embodiments, the composite material is used or only used at an gravimetric capacity below about 50% of the composite material's maximum gravimetric capacity or below about 30% of the composite material's maximum gravimetric capacity.

EXAMPLES

The following examples are provided to demonstrate the benefits of some embodiments of electrochemically active composite materials, electrodes, electrochemical cells, and methods of forming the same. These examples are discussed for illustrative purposes and should not be construed to limit the scope of the disclosed embodiments.

Example electrodes were prepared showing the growth of metal compound particles at the interface of an electrochemically active material and a metal substrate (e.g., to provide additional adhesion between the active material and the metal substrate). In one example (Example 1), anode slurry was mixed with the formulation shown in Table 1, and was cast on copper metal foil. The as-coated and dried anode was calendered to achieve a density of 1.1-1.3 g/cm$^3$, followed by vacuum drying at 120° C. for 16 hours. After that, the anode was annealed/pyrolyzed at 750° C. for 2 hours under argon (Ar) atmosphere.

TABLE I

| Component | Percentage (%) |
|---|---|
| Silicon | 22.64 |
| NMP | 17.86 |
| Graphite | 1.37 |
| Polyimide Resin | 58.09 |
| Surfactant | 0.04 |

Figures 5A, 5B, 5C:
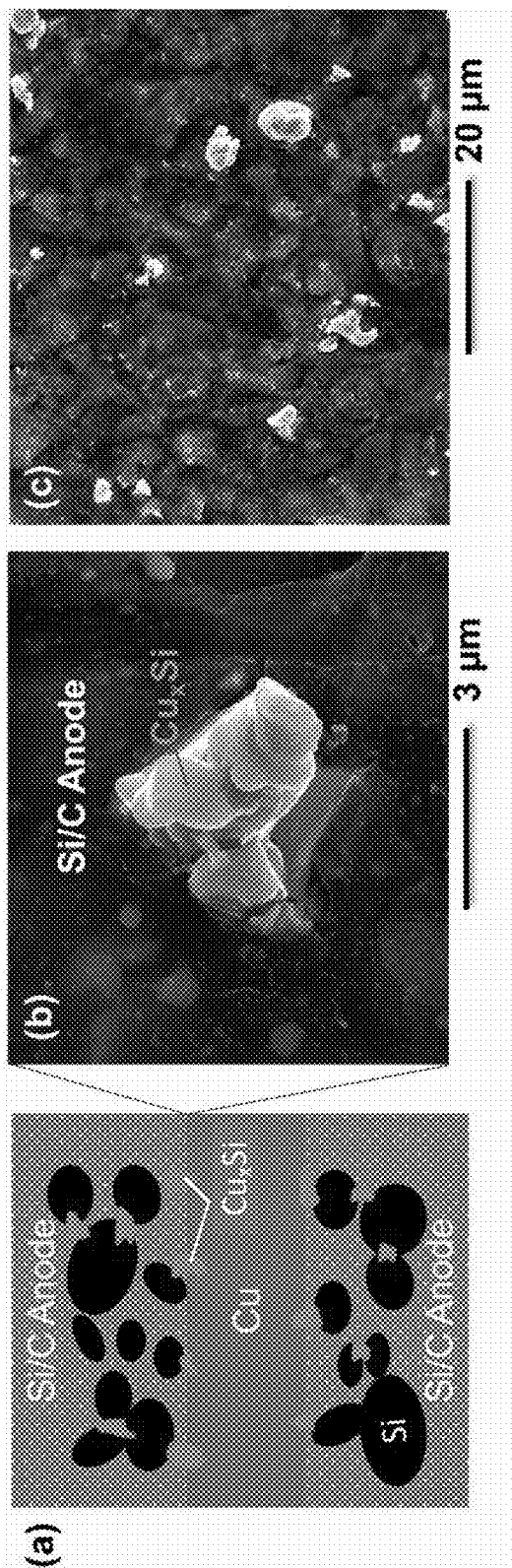
FIG. 5A schematically illustrates copper silicide particles at the interface of a Si/C anode film and Cu foil.
FIGS. 5B and 5C are Scanning Electron Microscopy (SEM) images of the interface between a Si/C anode film and Cu foil in accordance with certain embodiments described herein.
Figure 6:
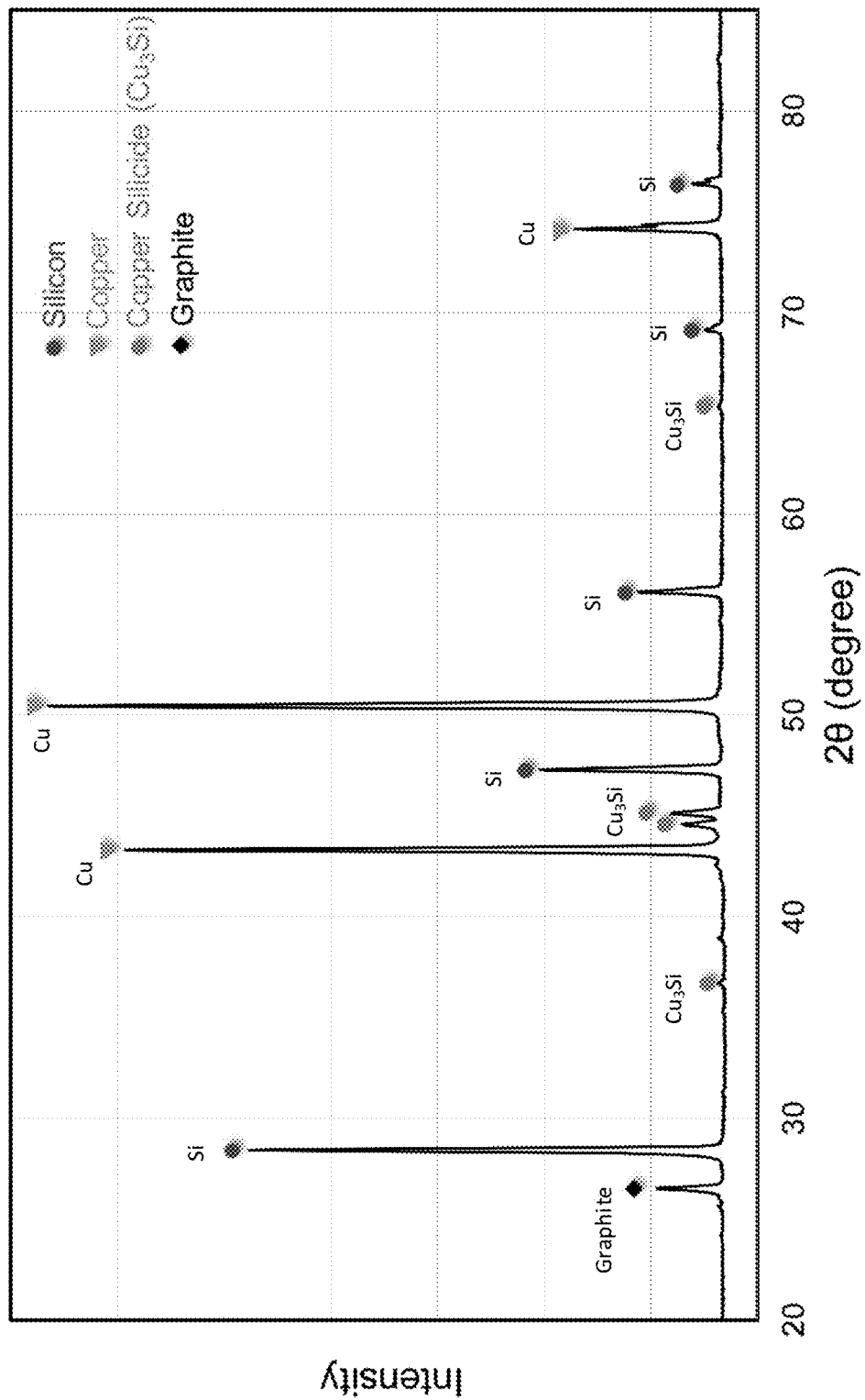
FIG. 6 is an X-Ray Diffraction (XRD) pattern showing the presence of the intermetallic silicide phase $Cu_3Si$ at the interface between a Si/C anode film and Cu foil in accordance with certain embodiments described herein.

FIG. 5A schematically illustrates metal silicide particles (e.g., $Cu_xSi$) at the interface of the silicon-carbon composite material (e.g., Si/C anode film) and the copper metal substrate (e.g., Cu foil). Without being bound by theory, it is believed that the $Cu_xSi$ can work as a binding material formed between the Si/C anode film and Cu foil to provide additional adhesion between the two materials. To detect the formation of a $Cu_xSi$ phase at the interface, the anode was defoliated from the Cu substrate with a strong adhesive tape to expose the interface between the Cu foil and the Si/C anode film. FIGS. 5B and 5C are Scanning Electron Microscopy (SEM) images of the interface between the Cu foil and the Si/C anode film. In FIG. 5B, a $Cu_xSi$ particle is comparatively brighter on the surface of the darker Si/C film. In FIG. 5C, a low-magnification image shows the distribution of the $Cu_xSi$ particles on the Si/C anode film (e.g., on the side facing the Cu foil during heat treatment). Without being bound by theory, the Si/C anode film surface where the highest points of the anode film would contact the Cu foil have reacted and converted to a copper silicide indicating that the $Cu_xSi$ particles are binding the active Si/C anode film and the Cu foil. An X-Ray Diffraction (XRD) analysis was performed to identify the phases of copper silicides on the exfoliated Si/C anode. FIG. 6 is an XRD pattern showing the presence of the intermetallic silicide phase $Cu_3Si$ at the interface between the Si/C anode film and Cu foil. The copper silicide phase was present along with silicon, graphite, and copper phases.

Example composite materials were also prepared to form a metal silicide phase between electrochemically active particles within an anode film. Without being bound by theory, it is believed that a metal silicide phase can provide additional cohesion between the active particles. In some examples, to form a metal silicide phase between Si particles within an anode film, copper (Cu) and nickel (Ni) powders were added into the anode slurry as metal sources. To detect the formation of a metal silicide phase without complication from the current collector, the slurry was cast onto a polyethylene (PET) film instead of a metal foil.

The anode slurry was made in a Centrifugal Planetary Mixer by adding vacuum dried Cu and Ni metal particles with sizes in the nanometer or micrometer range (e.g., <100 μm) into a premixed and degassed slurry containing silicon, resin and NMP solvent. The composition of the formulation was roughly about 2% metal particles, 22-24% Si, 56% polyamic acid resin and 20% NMP. The slurry was hand-coated onto a PET film and dried in an oven at 80-160° C. for a few minutes. The coated film was peeled off from the PET substrate and cured in a vacuum oven at 200° C. overnight. The cured material was pyrolyzed in a furnace under inert atmosphere under different final temperatures and dwell times.

Figure 7:
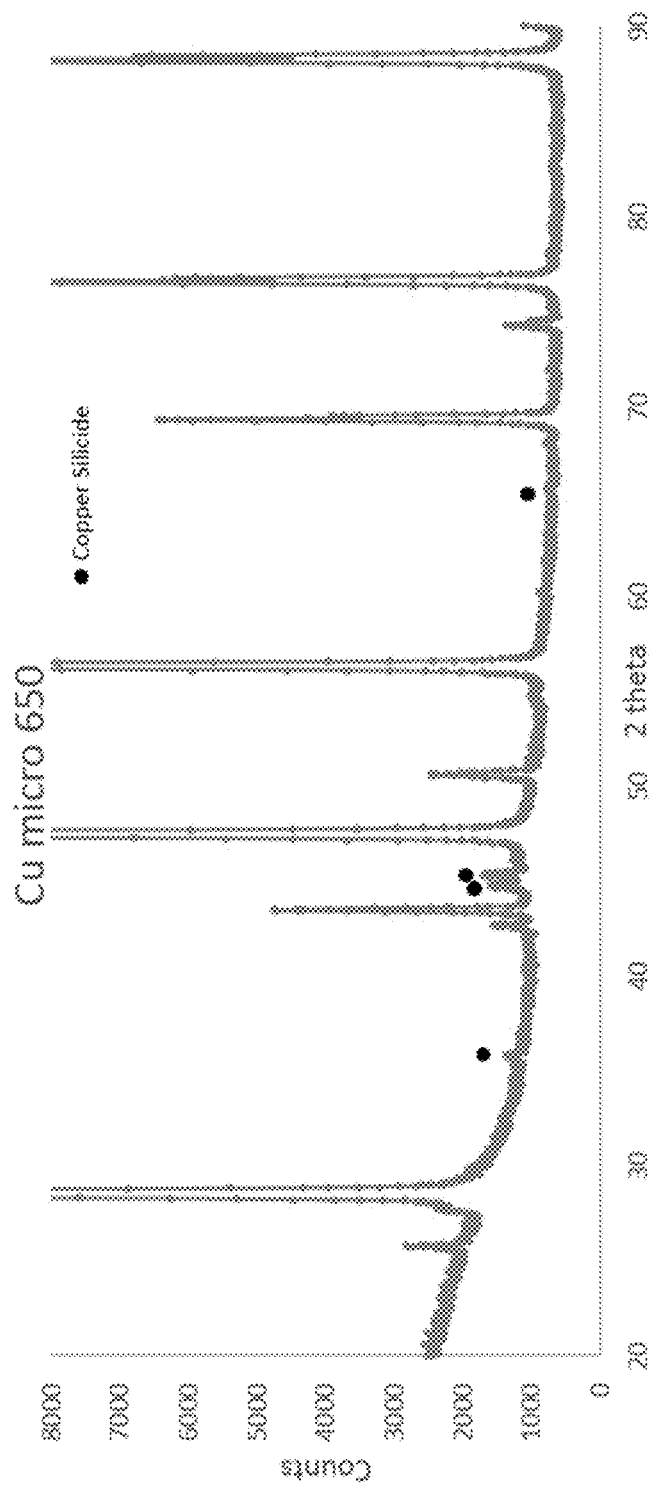
FIG. 7 is an XRD pattern showing presence of a copper silicide phase after treatment at 650° C.
Figure 8:
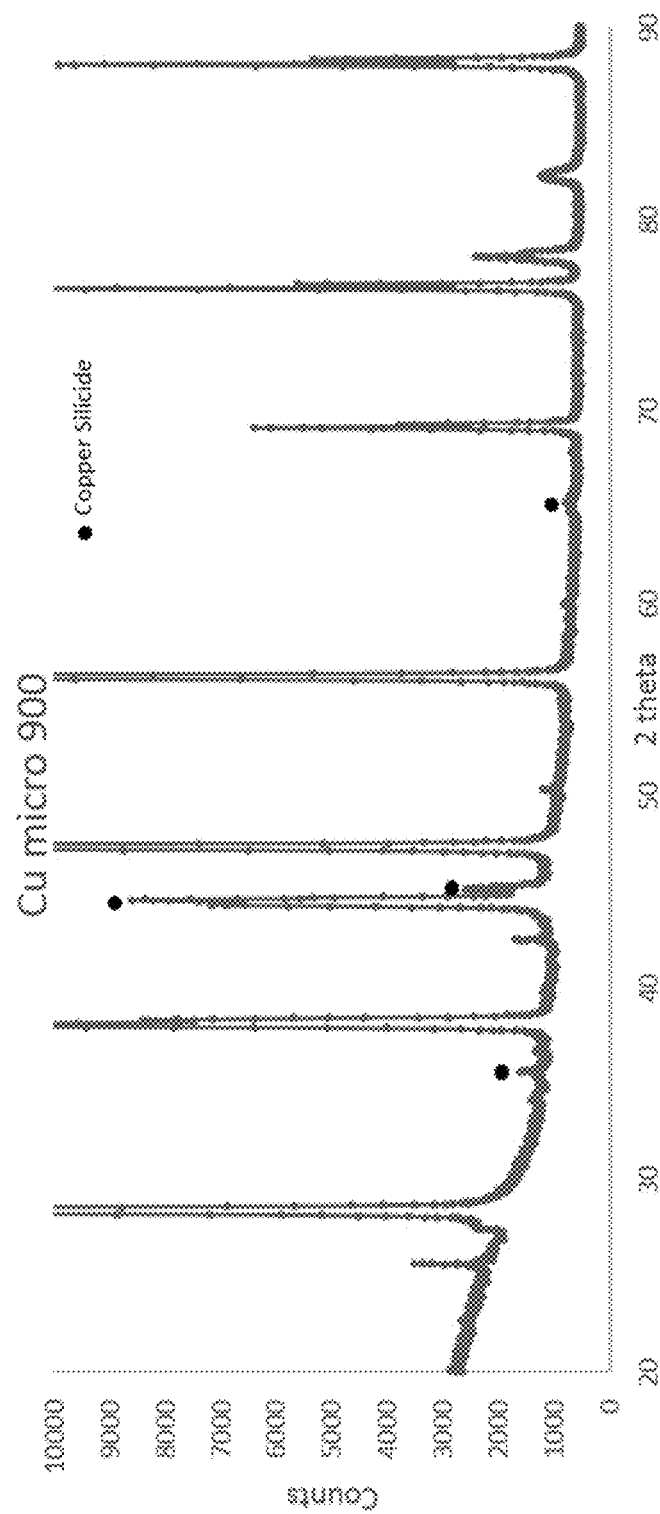
FIG. 8 is an XRD pattern showing presence of a copper silicide phase after treatment at 900° C.
Figure 9:
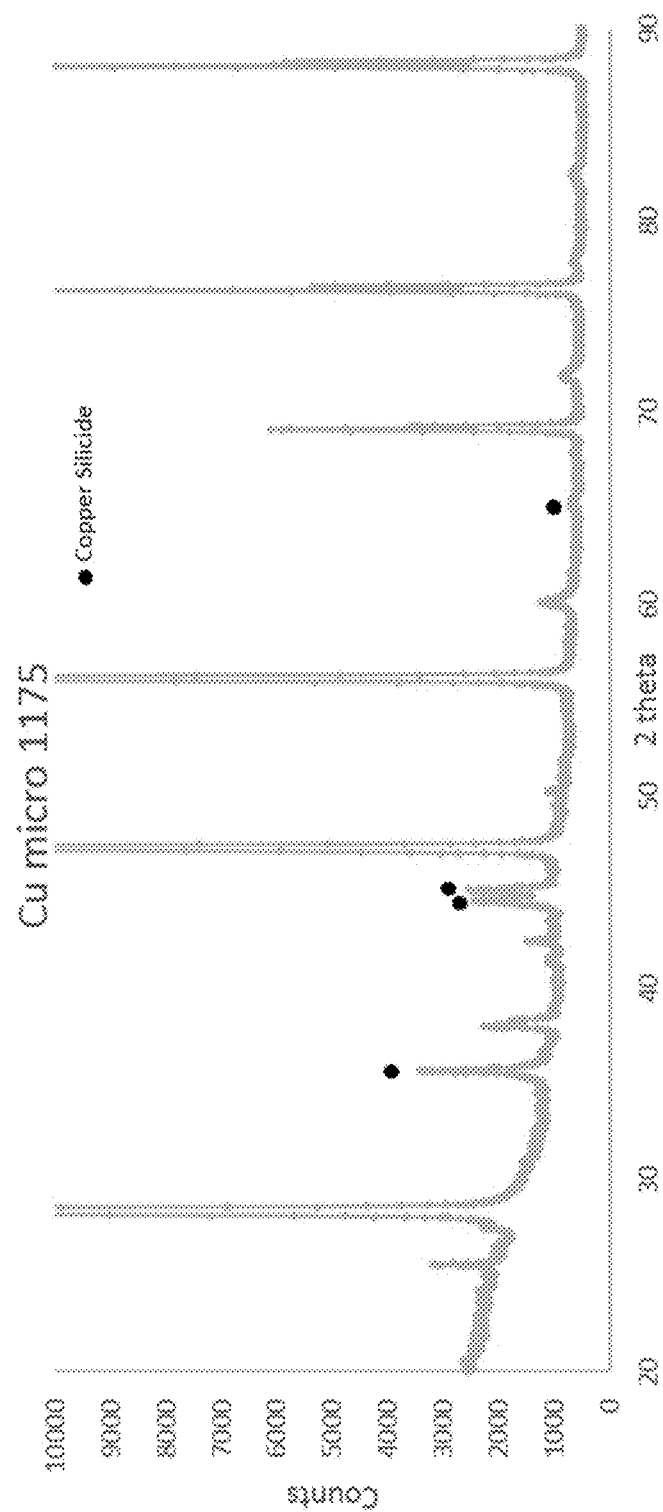
FIG. 9 is an XRD pattern showing presence of a copper silicide phase after treatment at 1175° C.
Figure 10:
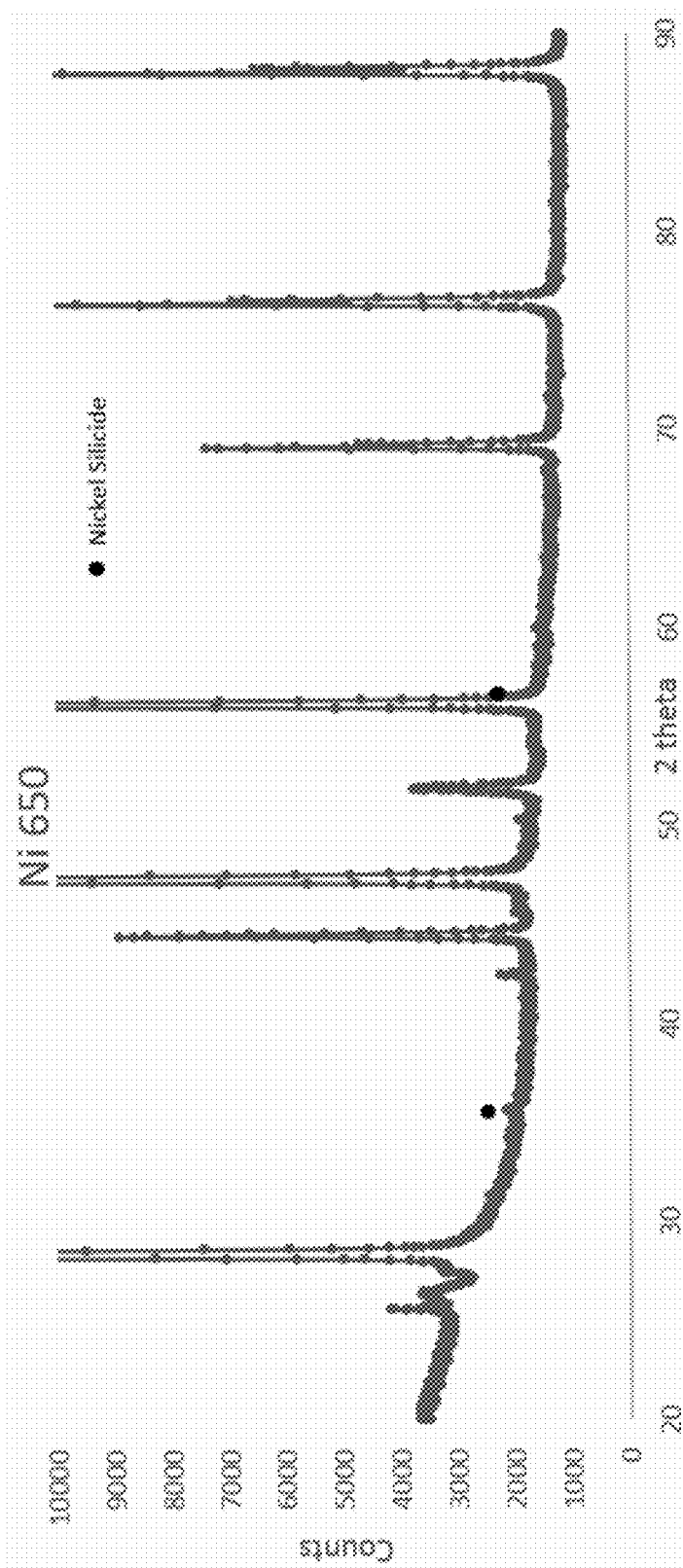
FIG. 10 is an XRD pattern showing presence of nickel silicide phase after treatment at 650° C.
Figure 11:
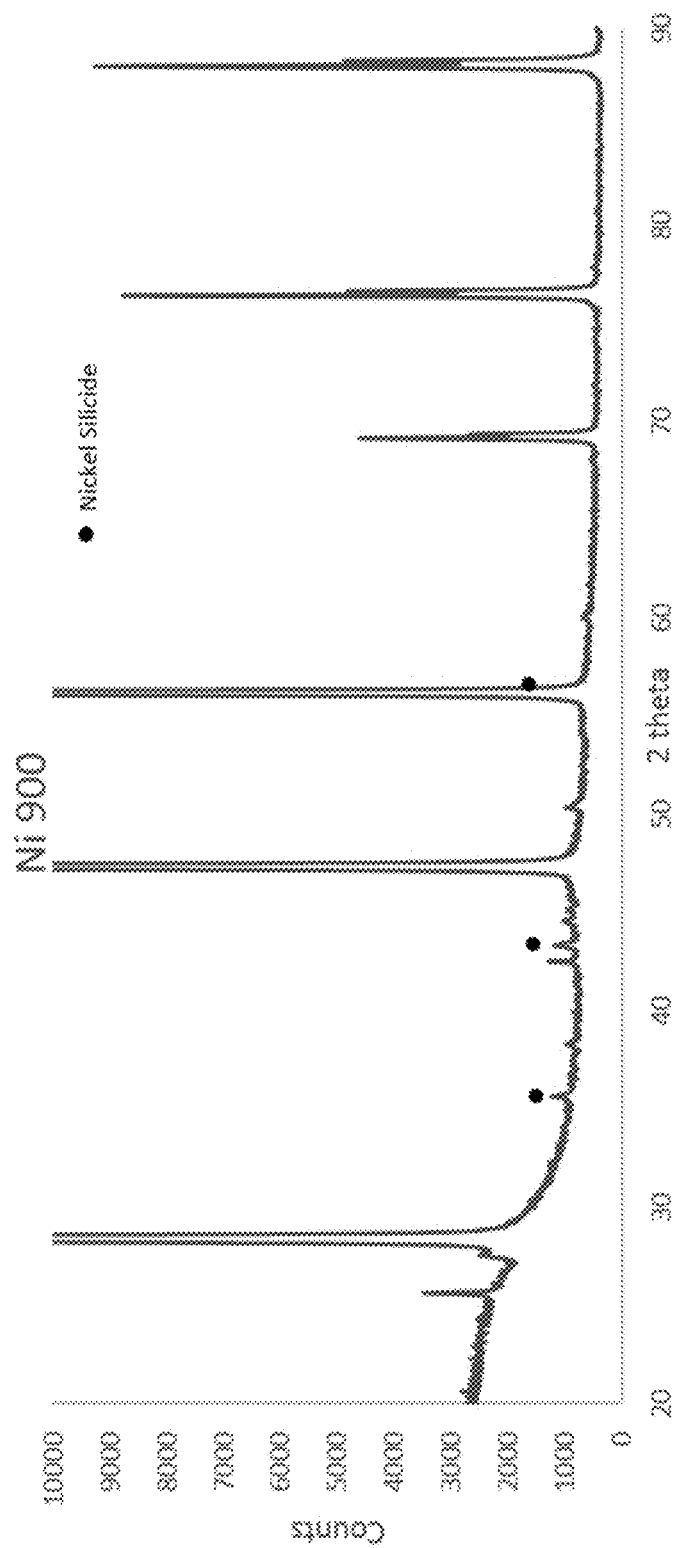
FIG. 11 is an XRD pattern showing presence of nickel silicide phase after treatment at 900° C.
Figure 12:
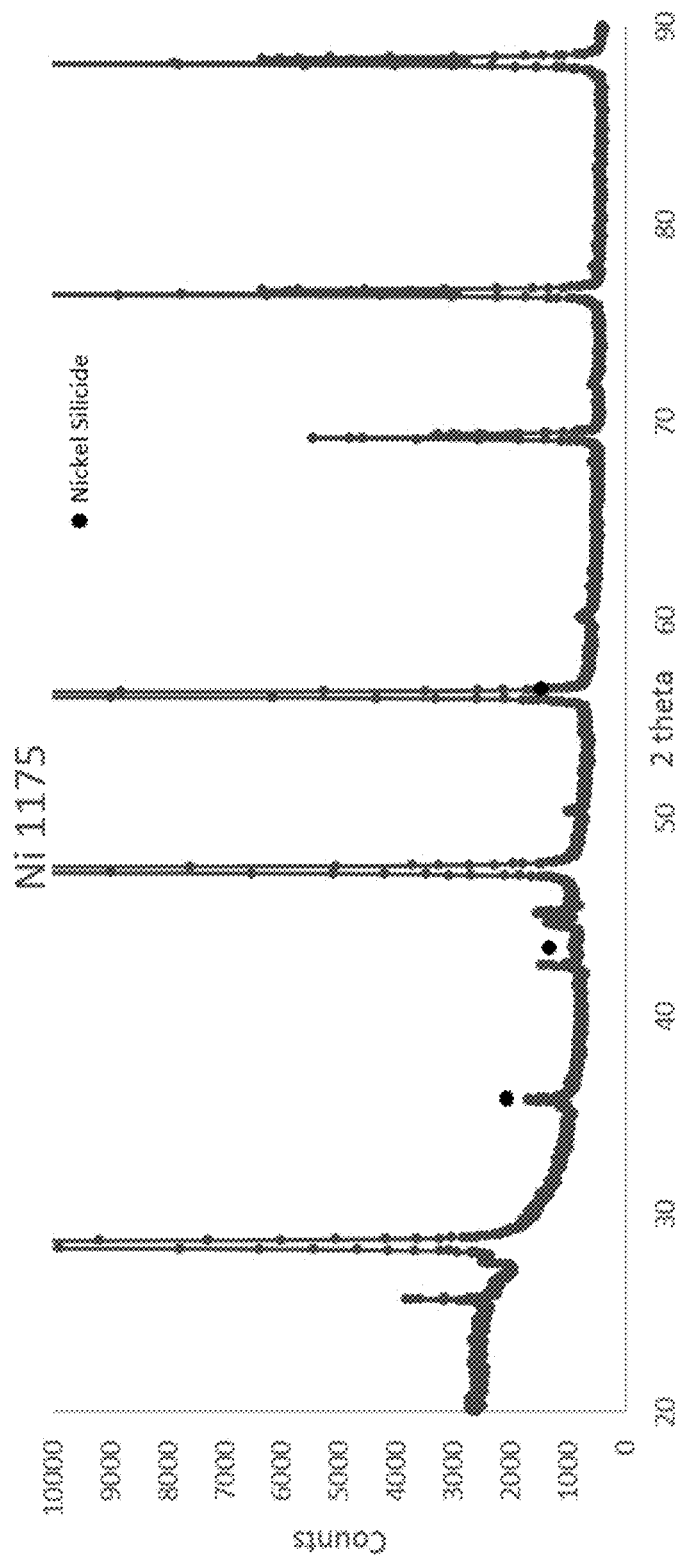
FIG. 12 is an XRD pattern showing presence of nickel silicide phase after treatment at 1175° C.

FIGS. 7-12 are XRD patterns showing the presence of metal silicides in Si/C anode films at different heat treatment temperatures. FIGS. 7-9 show the formation of a copper silicide phase at a heat treatment of 650° C., 900° C., and 1175° C. respectively for a duration of 1-2 hours. FIGS. 10-12 show the formation of a nickel silicide phase at a heat treatment of 650° C., 900° C., and 1175° C. respectively for a duration of 1-2 hours.

Figure 13:
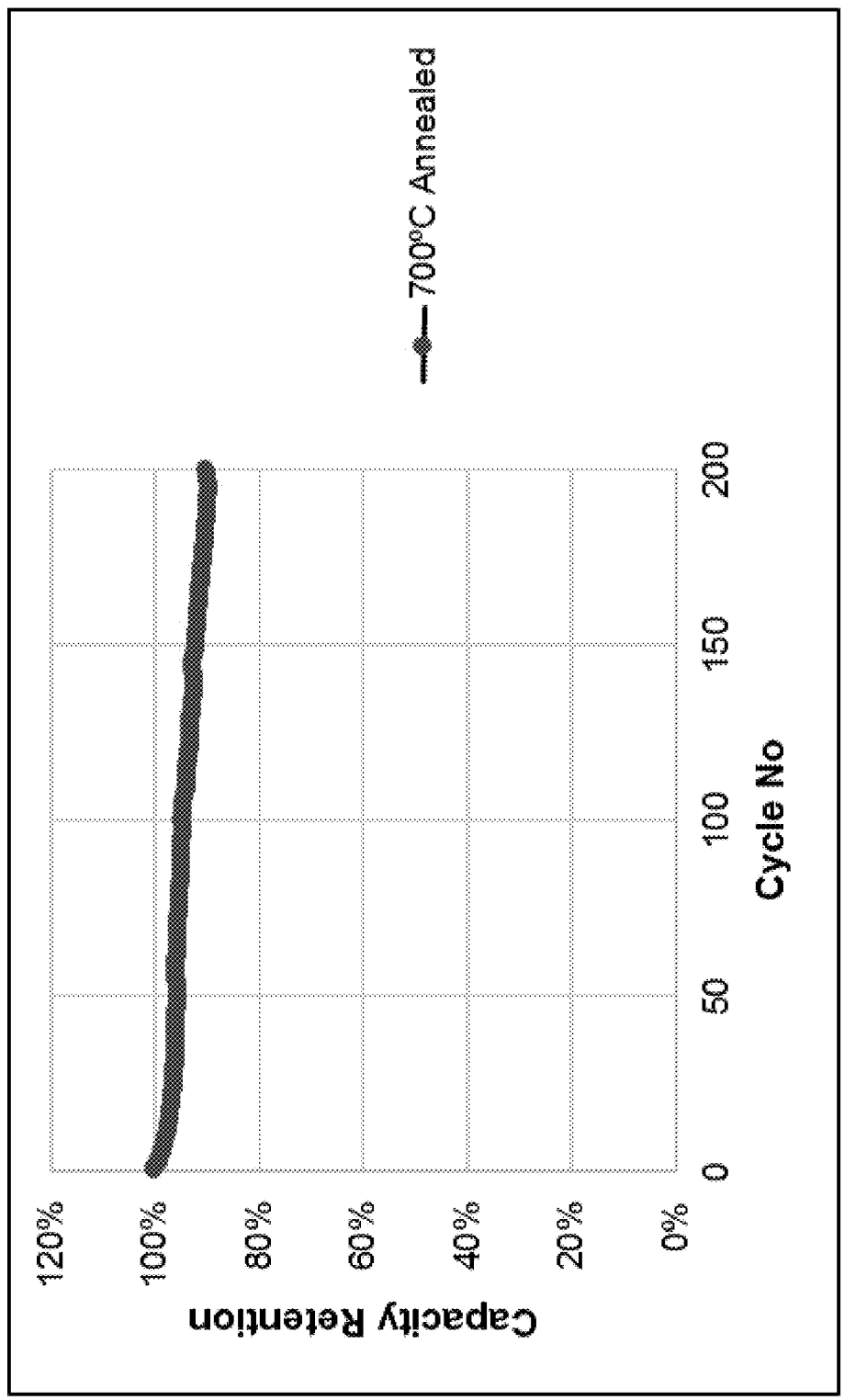
FIG. 13 shows the capacity retention of a cycled full cell having an example anode as described herein.

Example electrodes were prepared to test electrochemical performance. In one example, an anode was prepared using similar process conditions as Example 1. The slurry was coated in a continuous roll process onto a stainless steel core. Since $Cu_xSi$ can be formed at 650° C., the roll was annealed at 700° C. The full pouch stacked cell was prepared with a NCM622 based cathode and electrolyte of FEC: EMC=30:70 wt % at 1.0M of $LiPF_6$. The cathode had NCM622 as an active material at 92 wt %, carbon additive and PVDF as a binder, and a 15 micron thick Al foil. The cathode had a 3.0 g/cm³ electrode density. FIG. 13 shows the capacity retention of the full cell cycled at Constant Current Constant Voltage (CCCV) at 4.2V and 0.05 C top off and discharge to 3.3V at 2.3 mA/cm². FIG. 13 shows stable cycling of the example full cell. Without being bound by theory, it is believed that stable cycling is attributed to the formation of copper silicide acting as a binding agent to maintain electrical contact between the Si/C composite anode film and Cu foil.

FIG. 14A is an SEM image of the Cu current collector used in Example 1. The copper current collector had a surface roughness of 1.33 Rz/μm. With reference to FIG. 5C, although $Cu_3Si$ formed on the Cu foil, in some embodiments, a higher amount of $Cu_3Si$ phase may be desired. FIG. 14B is an SEM image of a Cu current collector having a surface roughness of 4.06 Rz/μm. The slurry composition from Example 1 was coated on the rougher Cu substrate followed by calendaring to have an electrode density at 1.3 g/cm³. After pyrolysis, an adhesion test was performed. FIG. 15 shows the results of the adhesion test for the current collector (Example A) having a 1.33 Rz/μm surface roughness and the current collector (Example B) having a 4.06 Rz/μm surface roughness. More anode material remained on the current collector with a higher surface area (e.g., due to a rougher current collector) indicating stronger adhesion (stronger interaction) between anode and Cu foil.

Figure 16:
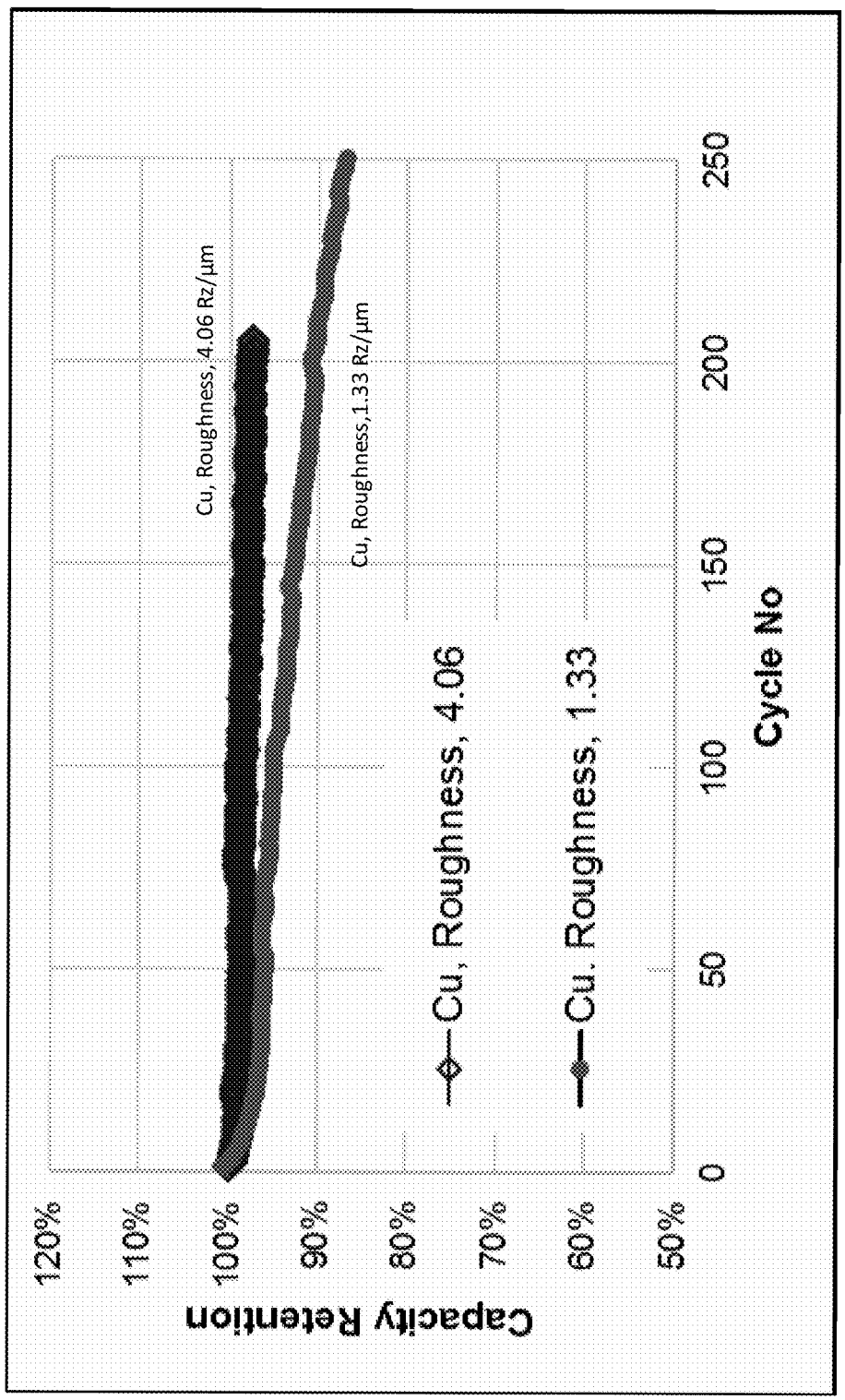
FIG. 16 shows the capacity retention of cycled full cells having example anodes as described herein.

An example full pouch cell was prepared with a similar NCM622 based cathode and electrolyte as used in the example cell cycled in FIG. 13, but with an anode having a current collector with a higher roughness. FIG. 16 shows the capacity retention of the example full cells cycled at Constant Current Constant Voltage (CCCV) at 4.2V and 0.05 C top off and discharge to 3.3V at 2.3 mA/cm². FIG. 16 shows that the cycle retention enhanced with the current collector having a rougher surface. Without being bound by theory, it is believed that the enhanced performance can be attributed to more reactions between the Si and Cu.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. An electrode comprising:
    a current collector comprising one or more layers of metal;
    a composite material in electrical communication with the current collector, wherein the composite material comprises from greater than 1% to about 30% by weight of one or more types of carbon phases and from greater than 70% to about 99% by weight of electrochemically active material; and
    at least one phase between the composite material and the current collector, wherein the at least one phase is configured to adhere the composite material to the current collector, and wherein the at least one phase comprises a compound of the metal and the electrochemically active material;
    wherein the electrochemically active material comprises silicon particles and wherein said at least one phase is configured to bind the silicon particles together and/or the silicon particles to the one or more types of carbon phases; and
    wherein the median particle size of the silicon particles is in between about 0.5 μm and about 20 μm.

2. The electrode of claim 1, wherein the current collector comprises copper, nickel, iron, titanium, molybdenum, stainless steel, chromium, aluminum, or a combination thereof.

3. The electrode of claim 1, wherein the compound comprises a metal silicide.

4. The electrode of claim 3, wherein the metal silicide comprises copper silicide, nickel silicide, chromium silicide, aluminum silicide, titanium silicide, or a combination thereof.

5. The electrode of claim 1, wherein the current collector has a surface roughness from about 0.025 Rz/μm to about 25 Rz/μm.

6. The electrode of claim 5, wherein the surface roughness is from about 1.5 Rz/μm to about 25 Rz/μm.

7. The electrode of claim 6, wherein the surface roughness is from about 3 Rz/μm to about 25 Rz/μm.

8. The electrode of claim 1, further comprising at least one second phase within the composite material.

9. The electrode of claim 8, wherein the at least one second phase is configured to bind electrochemically active particles of the electrochemically active material together.

10. The electrode of claim 9, wherein the composite material comprises particles of a second metal, and the at least one second phase comprises a compound of the second metal and the electrochemically active material.

11. The electrode of claim 10, wherein the second metal comprises copper, nickel, iron, titanium, molybdenum, stainless steel, chromium, aluminum, or a combination thereof.

12. The electrode of claim 11, wherein the at least one second phase comprises a metal silicide.

13. The electrode of claim 12, wherein the metal silicide comprises copper silicide, nickel silicide, chromium silicide, aluminum silicide, titanium silicide, or a combination thereof.

14. The electrode of claim 1, wherein the electrochemically active material comprises silicon particles from about 50% to about 99% by weight.

15. The electrode of claim 14, wherein the electrochemically active material comprises the silicon particles from about 60% to about 99% by weight.

16. The electrode of claim 15, wherein the electrochemically active material comprises the silicon particles from about 70% to about 99% by weight.

17. The electrode of claim 1, wherein the electrode is a negative electrode.

18. An electrochemical cell comprising the electrode of claim 1.

19. The electrochemical cell of claim 18, wherein the electrochemical cell comprises a lithium ion battery, a magnesium battery, an aluminum battery, a sodium battery, or a combination thereof.

\* \* \* \* \*